(12) United States Patent
Terrenoire et al.

(10) Patent No.: US 8,293,825 B2
(45) Date of Patent: Oct. 23, 2012

(54) POLYMER DISPERSIONS CONTAINING PHOSPHOROUS POLYMERS AND EMULSIFIERS

(75) Inventors: Alexandre Terrenoire, Mannheim (DE); Chris Titmarsh, Mannheim (DE); Hideki Yamashita, Mie-gun (JP); Chee Seng Yong, Luang (MY); Mubarik Mahmood Chowdhry, Singapore (SG); Mun Hoe Stanley Kwan, Singapore (SG); Jonathan Allen, North Balwyn Victoria (AU)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/922,983

(22) PCT Filed: Mar. 20, 2009

(86) PCT No.: PCT/EP2009/053326
§ 371 (c)(1),
(2), (4) Date: Sep. 16, 2010

(87) PCT Pub. No.: WO2009/115607
PCT Pub. Date: Sep. 24, 2009

(65) Prior Publication Data
US 2011/0009540 A1    Jan. 13, 2011

(30) Foreign Application Priority Data
Mar. 20, 2008   (EP) .................................... 08153095

(51) Int. Cl.
*C08K 5/521* (2006.01)
(52) U.S. Cl. ........................................ 524/140; 524/130
(58) Field of Classification Search .................. 524/140, 524/130
See application file for complete search history.

(56) References Cited

U.S. PATENT DOCUMENTS

| 4,226,007 | A | 10/1980 | Duenser |
| 4,269,749 | A | 5/1981 | Marriott et al. |
| 2005/0069698 | A1 | 3/2005 | Eubanks et al. |
| 2005/0256257 | A1 | 11/2005 | Betremieux et al. |
| 2008/0095989 | A1 | 4/2008 | Eubanks et al. |
| 2010/0035065 | A1 | 2/2010 | Terrenoire et al. |

FOREIGN PATENT DOCUMENTS

| DE | 2 061 213 | 6/1971 |
| DE | 2 207 209 | 10/1971 |
| DE | 2 722 097 | 11/1978 |
| EP | 0 960 889 | 12/1999 |
| EP | 1 274 738 | 1/2003 |
| EP | 1 725 595 | 11/2006 |
| EP | 1 762 601 | 3/2007 |
| EP | 1 832 635 | 9/2007 |
| EP | 1 997 839 | 12/2008 |
| WO | 93 25588 | 12/1993 |
| WO | 2005 030495 | 4/2005 |
| WO | 2005 097853 | 10/2005 |
| WO | WO 2009/109622 A1 | 9/2009 |

OTHER PUBLICATIONS

U.S. Appl. No. 12/996,306, filed Dec. 3, 2010, Bette, et al.
U.S. Appl. No. 12/671,613, filed Feb. 1, 2010, Terrenoire, et al.
U.S. Appl. No. 12/743,436, filed Jul. 15, 2010, Terrenoire, et al.

*Primary Examiner* — Peter Szekely
(74) *Attorney, Agent, or Firm* — Oblon, Spivak, McClelland, Maier & Neustadt, L.L.P.

(57) ABSTRACT

The present invention relates to the use of a polymer dispersion (PD) comprising at least one polymer (P), obtainable by free-radical emulsion polymerization of at least one ethylenically unsaturated monomer (M1) and at least one monomer (M2) different therefrom and selected from esters of phosphonic acid or of phosphoric acid with unalkoxylated or alkoxylated hydroxyalkyl(meth)acrylates, and at least one emulsifier (E) selected from phosphoric esters with unalkoxylated or alkoxylated $C_8$-$C_{30}$ alkanols, and their salts, in coating materials to improve the scrub resistance of the coatings produced therefrom and/or to improve the burnish resistance of the coatings produced therefrom and/or to improve the stain resistance of the coatings produced therefrom and/or to improve the pigment distribution in the coatings produced therefrom and/or to reduce the emission of volatile organic compounds by the coatings produced therefrom, to polymer dispersions used in accordance with the invention, and to coating materials comprising the polymer dispersions of the invention.

2 Claims, No Drawings

POLYMER DISPERSIONS CONTAINING PHOSPHOROUS POLYMERS AND EMULSIFIERS

The present invention relates to the use of polymer dispersions comprising at least one polymer obtainable by free-radical emulsion polymerization of at least one ester of phosphonic acid or of phosphoric acid with an optionally alkoxylated hydroxyalkyl(meth)acrylate and an ethylenically unsaturated monomer different therefrom, and at least one ester of phosphoric acid with an optionally alkoxylated alkanol in coating materials to improve the properties of coatings, to polymer dispersions used in accordance with the invention, and to the coating materials comprising the polymer dispersions of the invention.

The quality of unpigmented and pigmented coating materials based on aqueous polymer dispersions is measured in particular by the gloss, stain resistance, scrub resistance, burnish resistance or pigment distribution of the coatings produced from them. Attempts to improve these features of the coatings by means of suitable additions to coating materials are therefore numerous.

EP 0 960 889 describes aqueous polymer dispersions obtainable by emulsion polymerization of a monomer mixture comprising alkyl(meth)acrylates, vinyl esters, vinyl aromatics or mixtures thereof in the presence of a protective colloid comprising in incorporated form ethylenically unsaturated, copolymerizable monomers having at least one phosphate or phosphonate group, and also describes their use as binders in anticorrosion coating materials.

EP 1 274 738 describes polymerizable, surface-active compounds of the formula $R^1$—C(O)—$R^2$—X, in which $R^1$ is an optionally substituted vinyl radical, $R^2$ is a divalent polyoxyalkylene radical, and X is a phosphate group, and their salts, and also describes their use for preparing an emulsion polymer.

EP 1 725 595 describes aqueous polymer dispersions whose polymer is obtainable from a monomer mixture which comprises at least one ethylenically unsaturated monomer that comprises no ionic group, at least one ethylenically unsaturated monomer having at least one carboxyl and/or carboxylic anhydride function, and at least one ethylenically unsaturated monomer having at least one phosphate, phosphonate and/or phosphinate group, the aqueous polymer dispersions comprising, optionally, an anionic surfactant of alkoxylated alkyl phosphate type, and describes coating compositions comprising such polymer dispersions, and also describes their use as a protective coating for metallic or plastic substrates.

EP 1 762 601 describes the use of anionic surfactants selected from monoesters of sulfuric or of phosphoric acid with optionally alkoxylated $C_8$-$C_{30}$ alkanols or $C_4$-$C_{30}$ alkylphenols to improve the stain resistance of aqueous coating compositions.

EP 1 832 635 describes coating compositions which comprise at least one monoethylenically unsaturated monomer, at least one anionic or acid-group-comprising monomer, at least one phosphorus monomer, and titanium dioxide, and also describes their use for producing scrub and stain resistant coatings.

None of the abovementioned documents describes coatings which feature simultaneously high stain resistance, high scrub resistance, high burnish resistance, and high pigment distribution. Instead, the prior art coatings are optimized exclusively for one of these properties. Moreover, the coating materials described in many cases contain additions which also have a certain volatility, something which has an adverse effect on the volatile organic compounds (VOC) content of the coatings produced from them.

It was an object of the present invention to provide polymer dispersions for use in coating materials that are suitable for improving the stain resistance and/or the scrub resistance and/or the burnish resistance and/or the pigment distribution of the coatings produced from them without having any substantial adverse effect on any other of these properties. As far as possible, the coatings produced from the coating materials based on these polymer dispersions ought to have a minimal volatile organic compounds (VOC) content.

Surprisingly it has been found that this object is achieved through the use of polymer dispersions which comprise at least one polymer obtainable by free-radical emulsion polymerization of at least one ester of phosphonic acid or of phosphoric acid with an optionally alkoxylated hydroxyalkyl (meth)acrylate and an ethylenically unsaturated monomer different therefrom, and at least one ester of phosphonic acid or of phosphoric acid with an optionally alkoxylated alkanol, in coating materials.

In a first aspect, therefore, the invention provides for the use of a polymer dispersion (PD) comprising:

i) at least one polymer (P) obtainable by free-radical emulsion polymerization of at least one ethylenically unsaturated monomer (M1) and at least one monomer (M2) different therefrom and selected from esters of phosphonic acid or of phosphoric acid with optionally alkoxylated hydroxyalkyl (meth)acrylates, and ii) at least one emulsifier (E) selected from compounds of the formula (I)

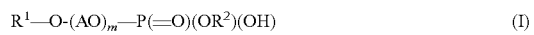

$$R^1\text{—O-}(AO)_m\text{—P}(\!=\!O)(OR^2)(OH) \qquad (I)$$

in which
m is an integer from 0 to 20,
AO is alkyleneoxy,
$R^1$ is $C_8$-$C_{30}$ alkyl, and
$R^2$ is H or a group -$(AO)_m$—$R^{2a}$, in which $R^{2a}$ is as defined for $R^1$, and AO and m have one of the above definitions,
and the salts of the compounds of the formula (I);
in a coating material to improve the scrub resistance of the coatings produced therefrom and/or to improve the burnish resistance of the coatings produced therefrom and/or to improve the stain resistance of the coatings produced therefrom and/or to improve the pigment distribution in the coatings produced therefrom and/or to reduce the emission of volatile organic compounds by the coatings produced therefrom.

The inventive use of the polymer dispersions (PD) in coating materials produces coatings which typically have not only high stain resistance but also high burnish resistance, high scrub resistance and/or high pigment distribution. Moreover, not only the polymer dispersions (PD) used in accordance with the invention but also the coating materials and coatings produced from them typically have a low volatile organic compounds (VOC) content.

In a further aspect, accordingly, the present invention provides for the use of a polymer dispersion (PD) as defined above to improve the scrub resistance of the coatings produced therefrom.

In a further aspect the present invention provides for the use of a polymer dispersion (PD) as defined above to improve the burnish resistance of the coatings produced therefrom.

In a further aspect the present invention provides for the use of a polymer dispersion (PD) as defined above to improve the stain resistance of the coatings produced therefrom.

In a further aspect the present invention provides for the use of a polymer dispersion (PD) as defined above to improve the pigment distribution in the coatings produced therefrom.

In a further aspect the present invention provides for the use of a polymer dispersion (PD) as defined above to reduce the emission of volatile organic compounds by the coatings produced therefrom.

In a further aspect the invention provides coating materials comprising a polymer dispersion (PD), the polymer dispersion (PD) comprising:

i) at least one polymer (P) obtainable by free-radical emulsion polymerization of at least one ethylenically unsaturated monomer (M1) and at least one monomer (M2) different therefrom and selected from esters of phosphonic acid or of phosphoric acid with optionally alkoxylated hydroxyalkyl (meth)acrylates, and ii) at least one emulsifier (E) selected from compounds of the formula (I)

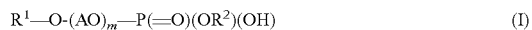

in which
m is an integer from 0 to 20,
AO is alkyleneoxy,
$R^1$ is $C_8$-$C_{30}$ alkyl, and
$R^2$ is H or a group -(AO)$_m$—$R^{2a}$, in which $R^{2a}$ is as defined for $R^1$, and AO and m have one of the above definitions,
and the salts of the compounds of the formula (I); and
the polymer dispersion (PD) being used to improve the scrub resistance of coatings produced from the coating materials and/or to improve the burnish resistance of coatings produced from the coating materials and/or to improve the stain resistance of coatings produced from the coating materials and/or to improve the pigment distribution in coatings produced from the coating materials and/or to reduce the emission of volatile organic compounds by coatings produced from the coating materials.

Additionally provided by the invention are the preferentially used polymer dispersions (PD), described below, and also coating materials in the form of an aqueous composition comprising at least one polymer dispersion (PD) of the invention and used in accordance with the invention.

In the context of the present invention the expression "alkyl" comprises straight-chain and branched alkyl groups, especially those having 1 to 30 carbon atoms, i.e., "$C_1$-$C_{30}$ alkyl".

Examples of suitable short-chain alkyl groups are straight-chain or branched $C_1$-$C_7$ alkyl-, preferably $C_1$-$C_6$ alkyl, and more preferably $C_1$-$C_4$ alkyl groups. They include more particularly methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl etc.

Examples of suitable longer-chain alkyl groups are straight-chain and branched $C_8$-$C_{30}$ alkyl groups, preferably $C_8$-$C_{20}$ alkyl groups. Preferably they are predominantly linear alkyl radicals, of the kind which also occur in natural or synthetic fatty acids and fatty alcohols and also oxy process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl and n-nonadecyl. The expression alkyl comprises unsubstituted and substituted alkyl radicals.

The above remarks relating to alkyl also apply mutatis mutandis to the alkyl groups in alkanol, alkanediol, and aminoalkanol.

The expression "alkylene", as used in alkyleneoxy, stands for straight-chain or branched alkanediyl groups, preferably having 1 to 7 carbon atoms, such as, for example, methylene, 1,2-ethylene, 1,2-propylene, 1,3-propylene, 1,2-butylene, 1,3-butylene, 1,4-butylene, 2-methyl-1,2-propylene, etc.

"Salts of the compounds of the formula (I)", in the context of the present invention are compounds which are composed of the phosphate anion or optionally, on the condition that $R^2$ is H, of the phosphate dianion of the compounds of the formula (I) and suitable cation equivalents. Preferably the salts of the compounds of the formula (I) are composed of the singly negatively charged phosphate anion and a cation equivalent. The cation equivalent is preferably selected from cations of alkali metals, such as lithium, sodium, and potassium, cations of alkaline earth metals, such as calcium or magnesium, and ammonium ions ($NH_4^+$), more preferably from sodium and/or potassium cations.

The expression "stain resistance" in the context of this invention is also understood to mean cleanability or especially washability. In the context of the present invention, it denotes the capacity of a coating to have only a small amount of staining after contact with a staining agent, such as stamp ink, pen ink, crayon, lipstick or mustard or with colorant-content beverages, e.g., red wine, coffee, tea, and the like, and cleaning. The stain resistance can be determined by first preparing a test coating of a coating material which comprises a polymer dispersion which is based on at least one ethylenically unsaturated phosphorous monomer M2) and at least one phosphorous emulsifier (E). This coating is then contacted with a staining agent, which constitutes a contaminant usual in the determination of stain resistance. After an exposure period, the staining agent is washed off and the coating is subjected to wet scouring under standardized conditions. The stain resistance can be characterized by statement of the delta E values (dE values). The delta E values serve to report color differences of two measured areas, and the CIE L*a*b* color system can be used. The delta E value is the color difference between an unstained region of a sample and a stained region of a sample, as a positive number. The smaller the delta E value, the smaller the color difference and the better the stain resistance of the coating deposit tested. Color measurements via delta E values using conventional spectrophotometers are known to the skilled worker and are described, for example, in AATCC Evaluation Procedure 7, "Instrumental Assessment of the Change in Color of a Test Specimen". Generally speaking, two or more experiments are carried out with different standard staining agents. Improvement in stain resistance is understood for the skilled worker to refer to a reduction in the stainability, measurable, for example, through a lower delta E value. Coating materials which comprise a polymer dispersion based on at least one ethylenically unsaturated phosphorous monomer M2) and at least one phosphorous emulsifier (E) are especially suitable for use in washable paints.

The expression "scrub resistance" in the context of the present invention denotes the capacity of a coating to exhibit only little abrasion on exposure by scrubbing. It can be determined, for example, through determination of the wet abrasion resistance in accordance with DIN EN ISO 11998 (October 2006). That standard specifies a method for determining the wet abrasion resistance. Depending on the loss of coat thickness, a subdivision is made into classes (e.g., classes 1 to 5, class 1: best, class 5: worst). The classification can be carried out in accordance with DIN EN 13300 (class 1: less than 5 μm in 200 scrub cycles, class 2: more than or equal to 5 μm and less than 20 μm in 200 scrub cycles, class 3: more than or equal to 20 μm and less than 70 μm in 200 scrub cycles, class 4: less than 70 μm in 40 scrub cycles, class 5: more than or equal to 70 μm in 40 scrub cycles). Alternatively, the scrub resistance may be determined in accordance with ASTM D 2486. An improvement in scrub resistance is understood by the skilled worker to refer to a reduction in the abrasion, as measurable, for example, through a reduced decrease in coat thickness of a coating, or an increase in the number of scrub cycles needed in order to scrub right through a coating.

The expression "burnish resistance" in the context of the present invention identifies the capacity of a coating to maintain its gloss level largely constant under dry rubbing. An increase in gloss of this kind is unwanted, particularly in the case of matt coatings. For the determination of the burnish resistance it is possible first of all to produce a sample coating of a coating material which comprises a polymer dispersion based on an ethylenically unsaturated phosphorous monomer M2) and at least one phosphorous emulsifier (E). The gloss of this coating is then determined in accordance with DIN EN ISO 2813. The coating is then subjected to scrubbing exposure in a scrubbing apparatus in accordance with DIN EN ISO 11998 (October 2006). The gloss is then ascertained again. The smaller the difference in the gloss values (i.e., the delta gloss value), the better the burnish resistance of the tested coating.

Coatings of coating materials which comprise a polymer dispersion based on an ethylenically unsaturated phosphorous monomer M2) and at least one phosphorous emulsifier (E) are notable, advantageously, for balanced performance properties in terms of stain resistance, scrub resistance, and burnish resistance. This means, in general, that good values are achieved for all of these properties, and in particular an improvement in one property does not imply any significant deterioration in another property.

The expression "pigment distribution" in the context of the present invention denotes the homogeneity of the arrangement of the pigments in the polymer dispersions of the invention, in the coating materials, and in the coatings obtainable from them. The pigment distribution can be determined in a first approximation, for example, via the burnish resistance.

The expression "volatile organic compound" (VOC) for the purposes of the present invention denotes organic compounds which have a boiling point <250° C. (under atmospheric pressure). Whereas the prior art coating materials frequently have such volatile organic compounds added to them, in the form of plasticizers, for example, the polymer dispersions and also the coating materials prepared from them comprise typically less than 150 g/l and frequently less than 50 g/l of volatile organic compounds.

The polymer dispersion (PD) used in accordance with the invention comprises at least one polymer (P) obtainable by free-radical emulsion polymerization of at least one ethylenically unsaturated monomer (M1) and of at least one monomer (M2) different therefrom.

α,β-Ethylenically unsaturated monomers (M1) suitable for preparing the polymer dispersion (PD) used in accordance with the invention are preferably selected from esters of α,β-ethylenically unsaturated monocarboxylic and dicarboxylic acids with $C_1$-$C_{30}$ alkanols, esters of vinyl alcohol or allyl alcohol with $C_1$-$C_{30}$ monocarboxylic acids, monoethylenically unsaturated carboxylic and sulfonic acids, ethylenically unsaturated dicarboxylic acids and the anhydrides and monoesters of ethylenically unsaturated dicarboxylic acids, primary amides of α,β-ethylenically unsaturated monocarboxylic acids and the N-alkyl and N,N-dialkyl derivatives thereof, vinylaromatics, ethylenically unsaturated nitriles, vinyl halides, vinylidene halides, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids, with $C_2$-$C_{30}$ amino alcohols, N-vinyllactams, open-chain N-vinylamide compounds, esters of α,β-ethylenically unsaturated monocarboxylic and dicarboxylic acids with amino alcohols, amides of α,β-ethylenically unsaturated monocarboxylic and dicarboxylic acids with diamines, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether(meth)acrylates, monomers containing urea groups and mixtures thereof.

The polymer dispersion (PD) used in accordance with the invention is preferably prepared using at least one α,β-ethylenically unsaturated monomer (M1) which is preferably selected from esters of α,β-ethylenically unsaturated monocarboxylic and dicarboxylic acids with $C_1$-$C_{30}$ alkanols, esters of vinyl alcohol or allyl alcohol with $C_1$-$C_{30}$ monocarboxylic acids, monoethylenically unsaturated carboxylic and sulfonic acids, primary amides of α,β-ethylenically unsaturated monocarboxylic acids and their N-alkyl and N,N-dialkyl derivatives, and mixtures thereof.

Further suitable monomers (M1) are, for example, vinylaromatics, ethylenically unsaturated nitriles, vinyl halides, vinylidene halides, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids, with $C_2$-$C_{30}$ amino alcohols, N-vinyllactams, open-chain N-vinylamide compounds, esters of α,β-ethylenically unsaturated monocarboxylic and dicarboxylic acids with amino alcohols, amides of α,β-ethylenically unsaturated monocarboxylic and dicarboxylic acids with diamines, and N,N-diallylamines, N,N-diallyl-N-alkylamines, vinyl- and allyl-substituted nitrogen heterocycles, and mixtures thereof.

Suitable esters of α,β-ethylenically unsaturated monocarboxylic and dicarboxylic acids with $C_1$-$C_{30}$ alkanols are methyl(meth)acrylate, methyl ethacrylate, ethyl(meth)acrylate, ethyl ethacrylate, n-propyl(meth)acrylate, isopropyl(meth)acrylate, n-butyl(meth)acrylate, sec-butyl(meth)acrylate, tert-butyl(meth)acrylate, tert-butyl ethacrylate, n-hexyl(meth)acrylate, n-heptyl(meth)acrylate, n-octyl(meth)acrylate, 1,1,3,3-tetramethylbutyl(meth)acrylate, ethylhexyl(meth)acrylate, n-nonyl(meth)acrylate, n-decyl(meth)acrylate, n-undecyl(meth)acrylate, tridecyl(meth)acrylate, myristyl(meth)acrylate, pentadecyl(meth)acrylate, palmityl(meth)acrylate, heptadecyl(meth)acrylate, nonadecyl(meth)acrylate, arachidyl(meth)acrylate, behenyl(meth)acrylate, lignoceryl(meth)acrylate, cerotinyl(meth)acrylate, melissyl(meth)acrylate, palmitoleyl(meth)acrylate, oleyl(meth)acrylate, linolyl(meth)acrylate, linolenyl(meth)acrylate, stearyl(meth)acrylate, lauryl(meth)acrylate, and mixtures thereof.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, Versatic acid vinyl esters, and mixtures thereof.

Suitable ethylenically unsaturated carboxylic acids and sulfonic acids or their derivatives are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, C atoms, examples being monomethyl maleate, vinyl sulfonic acid, allyl sulfonic acid, sulfoethyl acrylate, sulfoethyl methacrylate, sulfopropyl acrylate, sulfopropyl methacrylate, 2-hydroxy-3-acryloyloxypropyl sulfonic acid, 2-hydroxy-3-methacryloyloxypropyl sulfonic acid, styrene sulfonic acids, and 2-acrylamido-2-methylpropane sulfonic acid. Suitable styrene sulfonic acids and derivatives thereof are styrene-4-sulfonic acid and styrene-3-sulfonic acid and the alkaline earth metal or alkali metal salts thereof, e.g., sodium styrene-3-sulfonate and sodium styrene-4-sulfonate. Particularly preferred are acrylic acid, methacrylic acid, and mixtures thereof.

Suitable primary amides of α,β-ethylenically unsaturated monocarboxylic acids and their N-alkyl and N,N-dialkyl derivatives are acrylamide, methacrylamide, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)-acrylamide, N-(1,1,3,3-tetramethylbutyl)(meth)acrylamide, N-ethylhexyl(meth)-acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)-acrylamide, N-pentadecyl(meth)acrylamide, N-palmityl(meth)acrylamide, N-heptadecyl(meth)acrylamide, N-nonadecyl(meth) acrylamide, N-arachidyl(meth)-acrylamide, N-behenyl (meth)acrylamide, N-lignoceryl(meth)acrylamide, N-cerotinyl(meth)acrylamide, N-melissyl(meth)acrylamide, N-palmitoleyl(meth)-acrylamide, N-oleyl(meth)acrylamide, N-linolyl(meth)acrylamide, N-linolenyl(meth)-acrylamide, N-stearyl(meth)acrylamide, N-lauryl(meth)acrylamide, N,N-dimethyl(meth)-acrylamide, N,N-diethyl(meth)acrylamide, morpholinyl(meth)acrylamide and mixtures thereof.

Suitable vinylaromatics are styrene, 2-methylstyrene, 4-methylstyrene, 2-(n-butyl)styrene, 4-(n-butyl)styrene, 4-(n-decyl)styrene, more particularly styrene.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable esters of α,β-ethylenically unsaturated monocarboxylic and dicarboxylic acids with $C_2$-$C_{30}$-alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate and mixtures thereof.

Suitable amides of α,β-ethylenically unsaturated monocarboxylic and dicarboxylic acids with $C_2$-$C_{30}$ amino alcohols are, for example, N-(2-hydroxyethyl)acrylamide, N-(2-hydroxyethyl)methacrylamide, N-(2-hydroxyethyl)ethacrylamide, N-(2-hydroxypropyl)acrylamide, N-(2-hydroxypropyl)methacrylamide, N-(3-hydroxypropyl)acrylamide, N-(3-hydroxypropyl)methacrylamide, N-(3-hydroxy-butyl)acrylamide, N-(3-hydroxybutyl)methacrylamide, N-(4-hydroxybutyl)acrylamide, N-(4-hydroxybutyl)methacrylamide, N-(6-hydroxyhexyl)acrylamide, N-(6-hydroxyhexyl)methacrylamide, N-(3-hydroxy-2-ethylhexyl)acrylamide, N-(3-hydroxy-2-ethylhexyl)methacrylamide, N-methyl-N-(2-hydroxyethyl)acrylamide, N-methyl-N-(2-hydroxyethyl)methacrylamide, N-methyl-N-(2-hydroxyethyl)-ethacrylamide, N-methyl-N-(2-hydroxypropyl)acrylamide, N-methyl-N-(2-hydroxy-propyl)methacrylamide, N-methyl-N-(3-hydroxypropyl)acrylamide, N-methyl-N-(3-hydroxypropyl)methacrylamide, N-methyl-N-(3-hydroxybutyl)acrylamide, N-methyl-N-(3-hydroxybutyl)methacrylamide, N-methyl-N-(4-hydroxybutyl)acrylamide, N-methyl-N-methyl-N-(6-hydroxyhexyl)acrylamide, N-methyl-N-(6-hydroxyhexyl)methacrylamide, N-methyl-N-(3-hydroxy-2-ethylhexyl)acrylamide, N-methyl-N-(3-hydroxy-2-ethylhexyl)methacrylamide, and mixtures thereof.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, and mixtures thereof.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, N-vinylbutyramide, and mixtures thereof.

Suitable esters of α,β-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate, N,N-dimethylaminocyclohexyl(meth)acrylate, and mixtures thereof.

Suitable amides of α,β-ethylenically unsaturated monocarboxylic and dicarboxylic acids with diamines which have at least one primary or secondary amino group are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide, N-[4-(dimethylamino)cyclohexyl]methacrylamide, and mixtures thereof.

Suitable monomers (M1) are, additionally, N,N-diallylamines and N,N-diallyl-N-alkylamines and their acid addition salts and quaternization products. Alkyl in this case stands preferably for $C_1$-$C_{24}$ alkyl. Preference is given to N,N-diallyl-N-methylamine and N,N-diallyl-N,N-dimethylammonium compounds, such as the chlorides and bromides, for example.

Suitable monomers (M1) are, additionally, vinyl- and allyl-substituted nitrogenheterocycles, such as N-vinylimidazole, N-vinyl-2-methylimidazole, and vinyl- and allyl-substituted heteroaromatic compounds, such 2- and 4-vinylpyridine, 2- and 4-allylpyridine, and the salts thereof.

Suitable monomers (M1) are, additionally, $C_2$-$C_8$ monoolefins and nonaromatic hydrocarbons having at least two conjugated double bonds, for example, ethylene, propylene, isobutylene, isoprene, butadiene, etc.

Suitable polyether(meth)acrylates are compounds of the general formula (A)

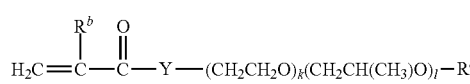

in which
the sequence of the alkylene oxide units is arbitrary,
k and independently of one another are an integer from 0 to 100, the sum of k and l being at least 3, $R^a$ is hydrogen, $C_1$-$C_{30}$ alkyl, $C_5$-$C_8$ cycloalkyl, $C_6$-$C_{14}$ aryl or ($C_6$-$C_{14}$)aryl($C_1$-$C_4$)alkyl, $R^b$ is hydrogen or $C_1$-$C_8$ alkyl, Y is O or $NR^c$, and $R^c$ is hydrogen, $C_1$-$C_{30}$ alkyl or $C_5$-$C_8$ cycloalkyl, Preferably k is an integer from 1 to 100, more preferably 3 to 50, more particularly 4 to 25. Preferably l is an integer from 0 to 100, more preferably 3 to 50, more particularly 4 to 25.

The sum of k and l is preferably 3 to 200, more particularly 4 to 100.

Preferably $R^a$ in the formula (A) is hydrogen or $C_1$-$C_{18}$ alkyl, such as methyl, ethyl, n-propyl, isopropyl, n-butyl, sec-butyl, n-pentyl, n-hexyl, octyl, 2-ethylhexyl, decyl, lauryl, palmityl or stearyl, and also benzyl.

Preferably $R^b$ is hydrogen or $C_1$-$C_6$ alkyl, such as methyl, ethyl, n-propyl, isopropyl, n-butyl, sec-butyl, tert-butyl, n-pentyl or n-hexyl, more particularly hydrogen, methyl or ethyl. More preferably $R^b$ is hydrogen or methyl.

Preferably Y in the formula (A) is O or NH, especially O.

In one specific version the free-radical emulsion polymerization for preparing PD) is carried out using at least one polyether(meth)acrylate. The polyether(meth)acrylate is used preferably in an amount of up to 25% by weight, more preferably up to 20% by weight, based on the total weight of the monomers used for the polymerization. For the emulsion polymerization it is particularly preferred to use 0% up to 20% by weight, preferably 0% to 15% by weight, of at least one polyether(meth)acrylate. Suitable polyether(meth)acrylates are, for example, the polycondensation products of the aforementioned α,β-ethylenically unsaturated monocarboxylic and/or dicarboxylic acids and their acid chlorides, acid amides, and acid anhydrides with polyetherols. Suitable polyetherols are readily preparable by reaction of ethylene oxide, 1,2-propylene oxide and/or epichlorohydrin with a starter molecule, such as water or a short-chain alcohol $R^a$—OH. The alkylene oxides can be used individually, in alternation successively, or as a mixture. The polyether acrylates can be used alone or in mixtures for preparing the emulsion polymers used in accordance with the invention. Suitable polyether(meth)-acrylates are available commercially, in the form, for example, of various products of the Bisomer® identification from Laporte Performance Chemicals, UK. This includes, for example, Bisomer® MPEG 350 MA, a methoxypolyethylene glycol monometh-acrylate.

In another specific version, the free-radical emulsion polymerization for preparing PD) is carried out using at least one monomer containing urea groups. This monomer is used preferably in an amount of up to 25% by weight, more preferably up to 20% by weight, based on the total weight of the monomers used for the polymerization. For the emulsion polymerization it is particularly preferred to use 0% up to 20% by weight, more particularly 0% to 15% by weight, of at least one monomer containing urea groups. Examples of suitable monomers containing urea groups include N-vinylurea or N-allylurea or derivatives of imidazolidin-2-one. These include N-vinyl- and N-allyl-imidazolidin-2-one, N-vinyloxyethylimidazolidin-2-one, N-(2-(meth)acrylamido-ethyl)imidazolidin-2-one, N-(2-(meth)acryloyloxyethyl)imidazolidin-2-one (i.e., 2-ureido-(meth)acrylate), N-[2-((meth)acryloyloxyacetamido)ethyl]imidazolidin-2-one, etc.

The aforementioned monomers (M1) can be used individually, in the form of mixtures within one class of monomer, or in the form of mixtures from different classes of monomer.

Preferred polymers (P) are obtainable by an emulsion polymerization in which the fraction of the monomers (M1) is in the range from 95% to 99.99%, more preferably in the range from 98% to 99.9%, and with very particular preference in the range from 99% to 99.8% by weight, based in each case on the total weight of the monomers used for the emulsion polymerization.

Also preferred are polymers (P) which are obtainable by an emulsion polymerization in which the main fraction of the monomers (M1) (referred to below as principal monomers (M1.a)), i.e., at least 50%, preferably at least 60%, and more preferably at least 80% by weight, based on the total weight of the monomers (M1), is selected from the above-preferred esters of α,β-ethylenically unsaturated monocarboxylic and dicarboxylic acids with $C_1$-$C_{30}$ alkanols, esters of vinyl alcohol or allyl alcohol with $C_1$-$C_{30}$ monocarboxylic acids, ethylenically unsaturated nitriles, vinyl halides, vinylidene halides, and mixtures thereof.

With particular preference the polymer (P) is obtainable by an emulsion polymerization in which at least 50%, preferably at least 60%, and more preferably at least 80% by weight of the monomers (M1), based on the total weight of the monomers (M1), are selected from esters of α,β-ethylenically unsaturated mono- and dicarboxylic acids with $C_1$-$C_{30}$ alkanols. With particular preference the principal monomers (M1.a) are then selected from esters of α,β-ethylenically unsaturated monocarboxylic and dicarboxylic acids with $C_1$-$C_{30}$ alkanols, especially from methyl(meth)acrylate, ethyl (meth)acrylate, n-propyl(meth)acrylate, isopropyl(meth)acrylate, n-butyl(meth)acrylate, sec-butyl(meth)acrylate, tert-butyl(meth)acrylate, n-pentyl(meth)acrylate, n-hexyl(meth)acrylate, n-heptyl(meth)acrylate, n-octyl(meth)acrylate, 2-ethylhexyl(meth)acrylate, and mixtures thereof.

One particularly suitable mixture of principal monomers (M1.a) for the process of the invention is, for example, n-butyl acrylate with methyl methacrylate.

The secondary fraction of the monomers (M1) (referred to below as secondary monomers (M1.b)), i.e., less than 50%, preferably less than 40%, and more preferably less than 20% by weight, based on the total weight of the monomers (M1), is preferably selected from ethylenically unsaturated monocarboxylic and dicarboxylic acids and the anhydrides and monoesters of ethylenically unsaturated dicarboxylic acids, and from (meth)acrylamides, $C_1$-$C_{10}$ hydroxyalkyl(meth)acrylates, $C_1$-$C_{10}$ hydroxyalkyl(meth)acrylamides, and mixtures thereof. With particular preference the secondary monomers (M1.b) are selected from acrylic acid, methacrylic acid, itaconic acid, maleic acid, fumaric acid, maleic anhydride, acrylamide, methacrylamide, and mixtures thereof.

The secondary monomers (M1.b), where present, are used typically in an amount of at least 0.1%, preferably at least 0.5%, and more preferably at least 1% by weight, based on the total weight of the monomers (M1), for the emulsion polymerization.

The particularly suitable mixture of principle monomers (M1.a), specified above, may preferably be combined with secondary monomers (M1.b) which are selected more particularly from acrylic acid, methacrylic acid, acrylamide, methacrylamide, and mixtures thereof.

In one specific embodiment the monomers (M1) comprise exclusively monomers selected from the above-preferred principal monomers (M1.a) and the above-preferred secondary monomers (M1.b).

In accordance with the invention the polymer (P) is obtainable by free-radical emulsion polymerization of at least one of the above-described monomers (M1) and of at least one monomer (M2) which is different therefrom.

Typically, in order to provide the polymer (P) by emulsion polymerization, up to 5%, preferably up to 2%, more preferably up to 1% by weight of at least one monomer (M2) would be used, based on the total weight of the monomers employed.

Furthermore, to provide the polymer (P) by emulsion polymerization, at least 0.01%, preferably at least 0.1%, more preferably at least 0.2% by weight of said at least one monomer (M2) will be used, based on the total weight of the monomers employed.

Suitable monomers (M2) are the esters, i.e., monoesters and diesters, of phosphonic acid or of phosphoric acid with hydroxyalkyl(meth)acrylates, especially the monoesters. Frequently the monoesters and diesters of phosphonic acid or of phosphoric acid will be present alongside one another. In one specific embodiment of the present invention the monomers (M2) will be a mixture of monoesters and diesters of phosphonic acid or of phosphoric acid.

Suitable monomers (M2) are also the diesters of phosphonic acid or of phosphoric acid which are esterified once with a hydroxyalkyl(meth)acrylate and additionally once with a different alcohol, such as with a $C_1$-$C_{30}$ alkanol, for example.

Suitable hydroxyalkyl(meth)acrylate constituents of the monomers (M2) are those specified below as separate monomers, more particularly 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, etc. Corresponding dihydrogen phosphate ester monomers comprise phosphoalkyl(meth)acrylates, such as 2-phosphoethyl(meth)acrylate, 2-phosphopropyl(meth)acrylate, 3-phosphopropyl(meth)acrylate, phosphobutyl(meth)acrylate and 3-phospho-2-hydroxypropyl(meth)acrylate.

Suitable monomers (M2) are also the esters of phosphonic acid or of phosphoric acid with alkoxylated hydroxyalkyl(meth)acrylates, examples being the esters of phosphonic acid or of phosphoric acid with ethylene oxide condensates of (meth)acrylates, such as $H_2C=CH-C(=O)O(CH_2CH_2O)_nP(OH)_2$, $H_2C=CH-C(=O)O(CH_2CH_2O)_nP(=O)(OH)_2$, $H_2C=C(CH_3)C(=O)O(CH_2CH_2O)_nP(OH)_2$, and $H_2C=C(CH_3)C(=O)O(CH_2CH_2O)_nP(=O)(OH)_2$, in which n is a number from 1 to 20.

Preferred monomers (M2) are esters of phosphoric acid with optionally alkoxylated hydroxyalkyl(meth)acrylates and mixtures thereof. Particularly preferred monomers (M2) are the monoesters of phosphoric acid with optionally alkoxylated hydroxyalkyl(meth)acrylates.

With particular preference the polymers (P) comprise a combination of acrylic acid and at least one ester of phosphoric acid with an ethylene oxide condensate of methacrylic acid with the formula $H_2C=C(CH_3)C(=O)O(CH_2CH_2O)_nP(=O)(OH)_2$, in which n is a number from 1 to 20, in copolymerized form. One preferentially suitable methacrylic ester of a terminally phosphoric-acid-modified polyethylene glycol of the formula $(CH_2=C(CH_3)C(=O)O(CH_2CH_2O)_7-P(=O)(OH)_2$ is available under the name Sipomer PAM 100 from Rhodia.

The polymers (P) preferably have a factor F in the range from more than 0.4 to 0.6, more preferably from 0.405 to 0.55, where F is the quantitative monomer weight ratio M2/(MS+M2) and MS stands for the parts by weight of ethylenically unsaturated monomers which contain at least one of the following groups: carboxyl groups, carboxylic anhydride groups or sulfonic acid groups. M2 identifies the monomers selected from esters of phosphonic acid or of phosphoric acid with optionally alkoxylated hydroxyalkyl(meth)acrylates.

Calculation of factor F:

$$F = \frac{M2}{MS + M2}$$

(where F=more than 0.4 to 0.6, more preferably F=0.405 to 0.55)

In one specific embodiment:

$$F = \frac{M2}{\text{acrylic acid} + M2}$$

where $M2=H_2C=C(CH_3)C(=O)O(CH_2CH_2O)_nP(=O)(OH)_2$ and n=1 to 20 and F=more than 0.4 to 0.6, more preferably F=0.405 to 0.55.

The polymers (P) are composed preferably of at least 95.01%, more preferably at least 98.1%, and very preferably at least 99.2% by weight, based in each case on the total weight of the polymers (P), of the monomers (M1) and (M2) in copolymerized form, and more particularly of the above-preferred monomers (M1) and (M2) in copolymerized form. The polymers (P) consist in a special embodiment only of the monomers (M1) and (M2) in copolymerized form.

In the preparation of the polymers (P) used in accordance with the invention it is possible, in addition to the aforementioned monomers (M1) and (M2), to use at least one crosslinker.

Monomers which possess a crosslinking function are compounds having at least two polymerizable, ethylenically unsaturated, nonconjugated double bonds in the molecule.

Crosslinking may also take place, for example, by photochemical activation. For that purpose it is possible to prepare the polymers (P) using additionally at least one monomer having photoactivable groups. Photoinitiators can also be added separately.

Crosslinking may also take place, for example, by functional groups which are able to enter into a chemical crosslinking reaction with functional groups that are complementary to them. These complementary groups may both be attached to the emulsion polymer. For crosslinking it is possible to use a crosslinker which is capable of entering into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; however, the crosslinkers comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, the neopentyl glycol monoester of hydroxypivalic acid, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which comprise ethylene oxide groups and propylene oxide groups in incorporated form. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. It will be appreciated that the polyhydric alcohols can also be used following reaction with ethylene oxide or propylene oxide, in the form of the corresponding ethoxylates or propoxylates, respectively. The polyhydric alcohols can also first be converted by reaction with epichlorohydrin into the corresponding glycidyl ethers.

Further suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. Alternatively it is possible to esterify the monohydric, unsaturated alcohols with polybasic carboxylic acids, examples being malonic acid, tartaric acid, trimellitic acid, phthalic acid, terephthalic acid, citric acid or succinic acid.

Further suitable crosslinkers are esters of unsaturated carboxylic acids with the above-described polyhydric alcohols, examples being those of oleic acid, crotonic acid, cinnamic acid or 10-undecenoic acid.

Also suitable as crosslinkers are straight-chain or branched, linear or cyclic, aliphatic or aromatic hydrocarbons which possess at least two double bonds, which in the case of aliphatic hydrocarbons must not be conjugated; examples are divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable as crosslinkers are the acrylamides, methacrylamides, and N-allylamines of amines having a functionality of at least two. Examples of such amines are 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides of allylamine and unsaturated carboxylic acids, such as acrylic acid, methacrylic acid, itaconic acid, maleic acid, or at least dibasic carboxylic acids, as have been described above.

Furthermore, triallylamine and triallylmonoalkylammonium salts, e.g., triallylmethylammonium chloride or triallylmethylammonium methyl sulfate, are suitable as crosslinkers.

Also suitable are N-vinyl compounds of urea derivatives, at least difunctional amides, cyanurates or urethanes, such as those, for example, of urea, ethyleneurea, propyleneurea or tartaramide, e.g., N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Additionally included among the crosslinking monomers are those which as well as an ethylenically unsaturated double bond have a reactive functional group, such as an aldehyde group, a keto group or an oxirane group, for example, that is able to react with an added crosslinker. The functional groups in question are preferably keto groups or aldehyde groups.

The keto or aldehyde groups are preferably attached to the polymer through copolymerization with copolymerizable ethylenically unsaturated compounds having keto or aldehyde groups. Suitable such compounds are acrolein, methacrolein, vinyl alkyl ketones having 1 to 20, preferably 1 to 10, carbon atoms in the alkyl radical, formylstyrene, (meth) acrylic acid alkyl esters having one or two keto or aldehyde groups, or one aldehyde group and one keto group, in the alkyl radical, the alkyl radical preferably comprising a total of 3 to 10 carbon atoms, examples being (meth)acryloyloxyalkylpropanals, of the kind described in DE-A-2722097. Suitable furthermore are also N-oxoalkyl(meth)acrylamides of the kind known, for example, from U.S. Pat. No. 4,226,007, DE-A-2061213 or DE-A-2207209. Particular preferred are acetoacetyl(meth)acrylate, acetoacetoxyethyl(meth) acrylate, and more particularly diacetoneacrylamide. The crosslinkers preferably comprise a compound having at least two functional groups, more particularly two to five functional groups, which are able to enter into a crosslinking reaction with the functional groups of the polymer, especially the keto or aldehyde groups. They include, for example, hydrazide, hydroxylamine or oxime ether or amino groups as functional groups for the crosslinking of the keto or aldehyde groups. Suitable compounds with hydrazide groups are, for example, polycarboxylic hydrazides having a molar weight of up to 500 g/mol. Particularly preferred hydrazide compounds are dicarboxylic dihydrazides having preferably 2 to 10 C atoms. Examples include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. The following are of particular interest: adipic dihydrazide, sebacic dihydrazide, and isophthalic dihydrazide. Suitable compounds having hydroxylamine or oxime ether groups are specified in WO 93/25588, for example.

Surface crosslinking can additionally be generated, moreover, by appropriate additization of the aqueous polymer dispersion (PD). This includes, for example, addition of a photoinitiator or of siccatives. Suitable photoinitiators are those which are excited by sunlight, examples being benzophenone or derivatives of benzophenone. Suitable siccatives for addition are the metal compounds that are recommended for aqueous alkyd resins, and are based, for example, on Co or Mn (overview in U. Poth, Polyester and Alkydharze, Vincentz Network 2005, p. 183 f.).

The crosslinking component is used preferably in an amount of 0.0005% to 4.99%, more preferably 0.001% to 2.5%, more particularly 0.01% to 1.5%, by weight, based on the total weight of the monomers used for the polymerization (including the crosslinker).

A special embodiment are polymer dispersions (PD) which comprise no copolymerized crosslinker.

The free-radical polymerization of the monomers (M1) and (M2) may take place in the presence of at least one regulator. The regulators are used preferably in an amount of 0.0005% to 5%, more preferably of 0.001% to 2.5%, and more particularly of 0.01% to 1.5%, by weight, based on the total weight of the monomers used for the polymerization.

Compounds referred to as regulators (polymerization regulators) are generally those which have high transfer constants. Regulators accelerate chain transfer reactions and so produce a reduction in the degree of polymerization of the resulting polymers, without affecting the overall reaction rate. Among the regulators a distinction may be made between monofunctional and difunctional or polyfunctional regulators, according to the number of functional groups in the molecule that can lead to one or more chain transfer reactions. Suitable regulators are described comprehensively, for example, by K. C. Berger and G. Brandrup in J. Brandrup, E. H. Immergut, Polymer Handbook, 3rd ed., John Wiley & Sons, New York, 1989, pp. II/81-II/141.

Examples of suitable regulators include aldehydes such as formaldehyde, acetaldehyde, propionaldehyde, n-butyraldehyde, isobutyraldehyde.

As regulators it is possible to use the following, furthermore: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ether, for example.

As regulators it is preferred to use compounds which comprise sulfur in bound form.

Examples of this kind of compound are inorganic hydrogen sulfites, disulfites and dithionites or organic sulfides, disulfides, polysulfides, sulfoxides, and sulfones. These include di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide, dimethyl sulfoxide, dialkyl sulfide, dialkyl disulfide and/or diaryl sulfide.

Additionally suitable as polymerization regulators are thiols (compounds which comprise sulfur in the form of SH groups, also referred to as mercaptans). Preferred regulators are mono-, di-, and poly-functional mercaptans, mercaptoalcohols and/or mercaptocarboxylic acids. Examples of these compounds are allyl thioglycolates, ethyl thioglycolate, cystein, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecyl mercaptan.

Examples of difunctional regulators, which comprise two sulfur atoms in bound form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates, and butanediol bisthioglycolate. Examples of polyfunctional regulators are compounds which comprise more than two sulfur atoms in bound form. Examples thereof are trifunctional and/or tetrafunctional mercaptans.

All of the stated regulators may be used individually or in combination with one another. One specific embodiment concerns the inventive use of polymers (P) which are prepared by free-radical emulsion polymerization without addition of a regulator. For preparing the polymers (P) it is possible to polymerize the monomers with the aid of free-radical initiators.

As initiators for the free-radical polymerization it is possible to use the peroxo compounds and/or azo compounds that are typical for that purpose, examples being alkali metal or ammonium peroxydisulfates, diacetyl peroxide, dibenzoyl peroxide, succinyl peroxide, di-tert-butyl peroxide, tert-butyl perbenzoate, tert-butyl perpivalate, tort-butyl peroxy-2-ethylhexanoate, tert-butyl permaleinate, cumene hydroperoxide, diisopropyl peroxydicarbamate, bis(o-toluoyl)peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis(2-amidino-propane)dihydrochloride or 2,2'-azobis(2-methylbutyronitrile). Also suitable are mixtures of these initiators.

As initiators it is also possible to use reduction/oxidation (i.e., redox) initiator systems. The redox initiator systems are composed of at least one, usually inorganic, reducing agent and one organic or inorganic oxidizing agent. The oxidizing component comprises, for example, the emulsion polymerization initiators already specified above. The reducing component comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite or reducing agents such as hydroxymethanesulfinic acid and salts thereof, or ascorbic acid. The redox initiator systems can be used along with soluble metal compounds whose metallic component is able to occur in a plurality of valence states. Typical redox initiator systems are, for example, ascorbic acid/iron(II)sulfate/sodium peroxodisulfate, tert-butyl hydroperoxide/sodium disulfite, tert-butyl hydroperoxide/Na hydroxymethanesulfinate. The individual components, the reducing component for example, may also be mixtures, an example being a mixture of the sodium salt of hydroxymethanesulfinic acid and sodium disulfite.

The amount of the initiators is generally 0.1% to 10% by weight, preferably 0.1% to 5% by weight, based on all of the monomers to be polymerized. It is also possible for two or more different initiators to be used in the emulsion polymerization.

The preparation of the polymers (P) used in accordance with the invention takes place typically in the presence of at least one surface-active compound. Suitable for this purpose, alongside the aforementioned emulsifiers (E), are more particularly protective colloids, of the kind described, for example, in Houben-Weyl, Methoden der organischen Chemie, volume XIV/1, Makromolekulare Stoffe, Georg Thieme Verlag, Stuttgart, 1961, pp. 411 to 420, and emulsifiers, of the kind described, for example, in Houben-Weyl, Methoden der organischen Chemie, volume 14/1, Makromolekulare Stoffe, Georg Thieme Verlag, Stuttgart, 1961, pages 192 to 208.

Besides the emulsifiers (E) used in accordance with the invention, suitable emulsifiers include not only anionic but also cationic and nonionic emulsifiers. As surface-active substances it is preferred to use emulsifiers, whose relative molecular weights are typically below those of protective colloids.

Suitable nonionic emulsifiers are araliphatic or aliphatic nonionic emulsifiers, examples being ethoxylated mono-, di-, and trialkylphenols (degree of ethoxylation: 3 to 50, alkyl radical: $C_4$-$C_{10}$), ethoxylates of long-chain alcohols (degree of ethoxylation: 3 to 100, alkyl radical: $C_8$-$C_{36}$), and also polyethylene oxide/polypropylene oxide homopolymers and copolymers. These may comprise the alkylene oxide units copolymerized in random distribution or in the form of blocks. Highly suitable are, for example, ethylene oxide/propylene oxide block copolymers. Preference is given to using ethoxylates of long-chain alkanols (alkyl radical $C_1$-$C_{30}$, average degree of ethoxylation 5 to 100) and, among these, particular preference to those having a linear $C_{12}$-$C_{20}$ alkyl radical and an average degree of ethoxylation of 10 to 50, and also ethoxylated monoalkylphenols.

Suitable anionic emulsifiers are, for example, alkali metal and ammonium salts of alkyl sulfates (alkyl radical: $C_8$-$C_{22}$), of sulfuric monoesters with ethoxylated alkanols (degree of ethoxylation: 2 to 50, alkyl radical: $C_{12}$-$C_{18}$) and with ethoxylated alkylphenols (degree of ethoxylation: 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208. Also suitable as anionic emulsifiers are bis(phenylsulfonic acid) ethers and their alkali metal or ammonium salts which carry a $C_4$-$C_{24}$ alkyl group on one or both aromatic rings. These compounds are common knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride or quaternary compounds of N—$C_6$-$C_{20}$-alkylpyridines, -morpholines or -imidazoles, e.g., N-laurylpyridinium chloride.

Where the preparation of the polymers (P) takes place in the presence of at least one surface-active compound, that compound is used generally in an amount of about 0.01% to 10% by weight, preferably 0.1% to 5% by weight, based on the amount of monomers to be polymerized.

The polymerization takes place in general at temperatures in a range from 0 to 150° C., preferably 20 to 100° C., more preferably 30 to 95° C. The polymerization takes place preferably under atmospheric pressure, although a polymerization under elevated pressure is also possible, such as under the autogenous pressure of the components used for the polymerization. In one suitable version the polymerization takes place in the presence of at least one inert gas, such as nitrogen or argon, for example.

The polymerization medium may be composed either of water alone or of mixtures of water and water-miscible liquids such as methanol. Preferably just water is used. The emulsion polymerization may be carried out either as a batch operation or in the form of a feed process, including staged or gradient procedures. Preference is given to the feed process, in which a portion of the polymerization batch or else a polymer seed is introduced as an initial charge and heated to the polymerization temperature, polymerization is commenced, and then the remainder of the polymerization batch, typically by way of two or more spatially separate feeds, of which one or more comprise the monomers in pure form or an emulsified form, is supplied to the polymerization zone continuously, in stages or under the superimposition of a concentration gradient, with the polymerization being maintained.

In one specific embodiment the polymer dispersion (PD) of the invention, and employed in accordance with the invention, is prepared using a seed polymer. The term seed polymer is understood by the skilled worker to refer to a finely divided polymer in the form of an aqueous polymer dispersion. The weight-average particle size of seed polymers (weight average, $d_{50}$ value) is typically below 200 nm, frequently in the range from 10 to 150 nm. The monomer compositions of the seed polymers are generally of minor importance. Suitability is possessed both by seed polymers which are composed predominantly of vinylaromatic monomers and more particularly of styrene seed (styrene seed, as they are called), and by seed polymers which are composed predominantly of $C_1$-$C_{10}$ alkyl acrylates and/or $C_1$-$C_{10}$ alkyl methacrylates, as for example of a mixture of butyl acrylate and methyl methacrylate.

Besides these principal monomers, which typically account for at least 80% by weight and more particularly at least 90% by weight of the seed polymer, the seed polymers may also comprise, in copolymerized form, monomers different from these, more particularly monomers having an increased water solubility, examples being monomers having at least one acid function and/or neutral monomers with increased solubility in water. The fraction of such monomers will generally not exceed 20% and more particularly 10% by weight, and, where they are present, is situated typically in the range from 0.1% to 10% by weight, based on the total amount of the monomers which constitute the seed polymer.

The manner in which the initiator is added to the polymerization vessel in the course of the free-radical aqueous emulsion polymerization is known to a person of ordinary skill in the art. It can be included in its entirety in the initial charge to the polymerization vessel, or else employed in stages or continuously in accordance with the rate of its consumption in the course of the free-radical aqueous emulsion polymerization. In each case this will depend, in a manner known per se to a person of ordinary skill in the art, both on the chemical nature of the initiator system and on the polymerization temperature. Preferably a portion is included in the initial charge and the remainder is supplied to the polymerization zone in accordance with the rate of its consumption.

The dispersions that are formed in the polymerization may be subjected, following the polymerizing operation, to a physical or chemical aftertreatment. Examples of such techniques are the known techniques for residual monomer reduction, such as aftertreatment by addition of polymerization initiators or mixtures of two or more polymerization initiators at suitable temperatures; aftertreatment of the polymer solution by means of water vapor or ammonia vapor; or stripping with inert gas; or treatment of the reaction mixture with oxidizing or reducing reagents; adsorption techniques such as the adsorption of impurities on selected media such as activated carbon, for example; or an ultrafiltration, for example.

The polymers (P) used in accordance with the invention preferably have a weight-average molecular weight $M_w$ in the range from about 1000 to 2 000 000, preferably 1500 to 1 000 000, and more particularly 2000 to 500 000. The determination of this molar mass can be accomplished by means of gel permeation chromatography using a standard, such as polymethyl methacrylate.

The glass transition temperature $T_g$ of the polymers (P) used in accordance with the invention is preferably less than 50° C., more preferably less than 40° C., more particularly less than 30° C.

Polymer dispersions (PD) used in accordance with the invention comprise at least one emulsifier (E) as well as the polymer (P) described above. Typically the free-radical emulsion polymerization takes place in the presence of this emulsifier (E). Alternatively the emulsifier (E) can be added only after emulsion polymerization has taken place.

Suitable emulsifiers (E) are the esters, i.e., the monoesters and diesters, of phosphoric acid with $C_8$-$C_{30}$ alkanols which are optionally alkoxylated up to 20 times, especially the monoesters. Frequently the monoesters and the diesters are provided as a mixture with one another. In one special embodiment of the present invention, therefore, the emulsifier (E) is present in the polymer dispersions (PD) in the form of a mixture of the monoesters and the diesters.

Suitable emulsifiers (E) are also the diesters of phosphoric acid which are esterified once with a $C_8$-$C_{30}$ alkanol optionally alkoxylated up to 20 times, and additionally once with a different $C_1$-$C_{30}$ alkanol, preferably with a $C_1$-$C_7$ alkanol.

The optionally alkoxylated $C_8$-$C_{30}$ alkanols are preferably ethoxylated and/or propoxylated, with particular preference ethoxylated; in other words, -(AO)$_m$— in the compounds of the formula (I) stands more preferably for a polyether group —(CH$_2$CH$_2$—O)$_m$.

In one preferred embodiment of the present invention m in the compounds of the formula (I) is at least 1 and more preferably at least 2. The value of m will typically not exceed 20, and frequently will not exceed 15.

Preferred emulsifiers (E) are compounds of the general formula $C_sH_{2s+1}O(CH_2CH_2O)_t$—P(=O)(OH)$_2$, in which s is 6 to 30 and t is 0 to 20.

Examples of preferred emulsifiers (E) are Maphos 24 T ($C_{10}H_{21}O(CH_2CH_2O)_4$—P(=O)(OH)$_2$) and Maphos 10 T ((2-ethylhexyl)phosphate), both from BASF BTC.

The polymer dispersions (PD) of the invention comprise generally up to 20%, preferably up to 10%, more preferably up to 5%, by weight of at least one emulsifier (E), based on the total weight of the monomers used for the emulsion polymerization. The polymer dispersions (PD) of the invention comprise generally at least 0.05%, preferably at least 0.1%, by weight of at least one emulsifier (E), based on the total weight of the monomers used for the emulsion polymerization.

Additionally it is possible to add typical auxiliaries and additives to the polymer dispersions (PD). Examples of such typical auxiliaries and additives include pH modifiers, reductants, and bleaches, such as the alkali metal salts of hydroxymethanesulfinic acid (e.g., Rongalit® C from BASF Aktiengesellschaft), complexing agents, deodorants, flavors, aromas, and viscosity modifiers, such as alcohols, e.g., glycerol, methanol, ethanol, tert-butanol, glycol, etc. These auxiliaries and additives may be added to the polymer dispersions in the initial charge, in one of the feeds, or after the end of the polymerization.

The aqueous polymer dispersion (PD) typically has a solids content of 20% to 70% by weight, preferably 40% to 65% by weight. In one special version the solids content is at least 50%, more especially at least 55%, more especially still at least 58% by weight. Solids contents of at least 60% by weight or even at least 65% by weight are possible.

Especially suitable for the inventive use are polymer dispersions (PD) comprising:

i) at least one polymer (P) obtainable by free-radical emulsion polymerization of a monomer composition comprising:
   95% to 99.99% by weight, based on the total weight of the monomers used for the emulsion polymerization, of an ethylenically unsaturated monomer (M1) selected from esters of α,β-ethylenically unsaturated monocarboxylic and dicarboxylic acids with $C_1$-$C_{30}$ alkanols, esters of vinyl alcohol or allyl alcohol with $C_1$-$C_{30}$ monocarboxylic acids, monoethylenically unsaturated carboxylic and sulfonic acids, primary amides of α,β-ethylenically unsaturated monocarboxylic acids and their N-alkyl and N,N-dialkyl derivatives, and mixtures thereof; and
   0.01% to 5% by weight, based on the total weight of the monomers used for the emulsion polymerization, of at least one monomer (M2) different therefrom and selected from esters of phosphonic acid or of phosphoric acid with optionally alkoxylated hydroxyalkyl(meth)acrylates; and ii) at least one emulsifier (E) selected from compounds of the formula (I) and the salts of the compounds of the formula (I), $$R^1\text{—O-(AO)}_m\text{—P(=O)(OR}^2)(OH) \quad (I)$$

in which
m is an integer from 0 to 20,
AO is alkyleneoxy,
$R^1$ is $C_8$-$C_{30}$ alkyl, and
$R^2$ is H or a group -(AO)$_m$—$R^{2a}$, in which $R^{2a}$ is as defined for $R^1$, and AO and m have one of the above definitions.

The particularly suitable polymer dispersions (PD) used in accordance with the invention are new and are suitable, by virtue of their use in coating materials, to improve the scrub resistance of the coatings produced therefrom and/or the burnish resistance of the coatings produced therefrom and/or the stain resistance of the coatings produced therefrom and/or the pigment distribution in the coatings produced therefrom and/or the emission of volatile organic compounds by the coatings produced therefrom. Accordingly these particularly suitable polymer dispersions used in accordance with the invention, and their use, are provided by the present invention.

In respect of preferred embodiments of the polymer dispersions (PD) of the invention, reference is made, in their entirety, to the observations above in the context of the inventive use.

The monomer composition used to provide the polymers (P) by free-radical emulsion polymerization may in accordance with the invention comprise, as well as the monomers (M1) and (M2), up to 4.99% by weight of further monomers, based on the total weight of the monomers used for the emulsion polymerization. Suitable further monomers include more particularly the monomers stated above in the context of the use as being further suitable monomers (M1), and also the monomers stated above as crosslinkers. Typically, however, the fraction of further monomers in the monomer composition used for the free-radical emulsion polymerization will not exceed 3%, preferably 1%, and more preferably 0.1% by weight.

In one specific embodiment of the present invention the fractions of monomers (M1) and (M2) in the monomer composition used for the free-radical emulsion polymerization add up to 100% by weight, based on the total weight of the monomers used for the emulsion polymerization; in other words the polymers (P) comprise in copolymerized form no monomers other than the monomers (M1) and (M2).

Preferably the polymer (P) comprised in the polymer dispersion (PD) of the invention is obtainable by an emulsion polymerization in which at least some of the monomers (M1) are selected from esters of α,β-ethylenically unsaturated monocarboxylic and dicarboxylic acids with $C_1$-$C_{30}$ alkanols. With regard to further preferred definitions and amounts of the monomers (M1) in the polymer dispersions (PD) of the invention, reference is made, in their entirety, to the observations made above.

Also preferably the polymer (P) comprised in the polymer dispersion (PD) of the invention is obtainable by an emulsion polymerization in which at least some of the monomers (M2) are selected from esters of phosphoric acid with optionally alkoxylated hydroxyalkyl(meth)acrylates, more particularly monoesters of phosphoric acid with optionally alkoxylated hydroxyalkyl(meth)acrylates, and mixtures thereof. With regard to further preferred definitions and amounts of the monomers (M2) in the polymer dispersions (PD) of the invention, reference is made, in their entirety, to the observations made above.

The polymer dispersions (PD) of the invention comprise up to 20%, preferably up to 10%, more preferably up to 5% by weight of at least one emulsifier (E), based on the total weight of the monomers used for the emulsion polymerization. With regard to the preferred definitions of the emulsifier (E) in the polymer dispersions (PD) of the invention, reference is made, in their entirety, to the observations made above.

The above-described polymer dispersions (PD) of the invention can be used as they are or as a mixture with further polymers, generally film-forming polymers, as a binder composition in aqueous coating materials, such as paint or varnish mixtures.

The polymer dispersions (PD) of the invention are employed preferably in aqueous coating materials. These coating materials take the form, for example, of an unpigmented system (clear varnish) or of a pigmented system. The fraction of the pigments can be described by the pigment volume concentration (PVC). The PVC describes the ratio of the volume of pigments ($V_p$) and fillers ($V_f$) to the total volume, composed of the volumes of binder ($V_b$), pigments, and fillers of a dried coating film, in percent: $PVC=(V_p+V_f)\times 100/(V_p+V_f+V_b)$. Coating materials can be divided on the basis of the PVC, for example, as follows:

| | |
|---|---|
| highly filled interior paint, wash resistant, white/matt | about 85 |
| interior paint, scrub resistant, white/matt | about 80 |
| semigloss paint, silkmatt | about 35 |
| semigloss paint, silkgloss | about 25 |
| gloss paint | about 15-25 |
| exterior masonry paint, white | about 45-55 |
| clear varnish | 0 |

One embodiment of the present invention relates to coating materials in the form of a clear varnish. Another embodiment of the present invention comprises coating materials in the form of an emulsion paint. The pigmented coating materials of the invention take the form preferably of an aqueous semigloss or gloss paint.

The invention provides in one aspect a coating material in the form of an aqueous composition, comprising:
  at least one polymer dispersion (PD) as defined above,
  at least one inorganic filler and/or at least one inorganic pigment,
  at least one typical auxiliary, and
  water.
Preference is given to a coating material comprising:
  10% to 60% by weight of at least one polymer dispersion (PD) as defined above,
  10% to 70% by weight of inorganic fillers and/or inorganic pigments,
  0.1% to 20% by weight of typical auxiliaries, and
  water to 100% by weight.

Elucidated in the text below is the composition of a typical emulsion paint. Emulsion paints comprise generally 30% to 75% and preferably 40% to 65% by weight of nonvolatile constituents. By these are meant all constituents of the preparation which are not water, but at least the total weight of binder, filler, pigment, low-volatility solvents (boiling point above 220° C.), plasticizers for example, and polymeric auxiliaries. This figure is accounted for to the extent of about
a) 3% to 90%, more particularly 10% to 60%, by weight, by the polymer dispersion (PD) of the invention,
b) 0% to 85%, preferably 5% to 60%, more particularly 10% to 50%, by weight, by at least one inorganic pigment,
c) 0% to 85%, more particularly 5% to 60%, by weight, by inorganic fillers, and
d) 0.1% to 40%, more particularly 0.5% to 20%, by weight, by typical auxiliaries.

The polymer dispersions (PD) of the invention are suitable more particularly for producing masonry paints with a PVC in the range from 30 to 65 or interior paints with a PVC in the range from 65 to 80. By the pigment volume concentration PVC is meant the ratio, multiplied by 100, of the total volume of pigments plus fillers divided by the total volume of pigments, fillers, and binder polymers; cf. Ullmann's Enzyklopädie der technischen Chemie, 4th edition, Volume 15, p. 667.

The term "pigment" is used in the context of this invention comprehensively to identify all pigments and fillers, examples being color pigments, white pigments, and inorganic fillers. These include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicone dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers, or comprise no fillers.

Finely divided fillers may also be used to increase the hiding power and/or to save on the use of white pigments. In order to adjust the hiding power, the hue, and the depth of color, it is preferred to use blends of color pigments and fillers.

The fraction of the pigments can be described, as described above, by the pigment volume concentration (PVC). Coating materials of the invention in the form of gloss paints, for example, have a PVC in the range from 12% to 35%, preferably 15% to 30%.

The coating material of the invention (aqueous coating material) may comprise, in addition to the polymer dispersion (PD), and, optionally, additional film-forming polymers and pigment, further auxiliaries.

The typical auxiliaries, in addition to the emulsifiers used in the polymerization, include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, and thickeners. Suitable thickeners are, for example, associative thickeners, such as polyurethane thickeners. The amount of the thickener is preferably less than 1% by weight, more preferably less than 0.6% by weight, of thickener, based on solids content of the coating material.

The coating materials of the invention are produced in a known way by blending the components in mixing apparatus customary for the purpose. It has been found appropriate to prepare an aqueous paste or dispersion from the pigments, water, and, optionally, the auxiliaries, and only then to mix the polymeric binder, i.e., in general, the aqueous dispersion of the polymer, with the pigment paste or pigment dispersion.

The coating materials of the invention comprise generally 30% to 75% and preferably 40% to 65% by weight of nonvolatile constituents. By these are meant all constituents of the preparation which are not water, but at least the total amount of binder, pigment, and auxiliary, based on the solids content of the coating material. The volatile constituents are primarily water.

The coating material of the invention may be applied to substrates in a typical way, as for example by spreading, spraying, dipping, rolling, knife coating, etc.

It is used preferably as an architectural coating material, i.e., for coating buildings or parts of buildings. The substrates in question may be mineral substrates such as renders, plaster or plasterboard, masonry or concrete, wood, woodbase materials, metal or paper, wallpaper for example, or plastic, PVC for example.

The coating material is used preferably for internal parts of buildings, such as interior walls, internal doors, paneling, banisters, furniture, etc.

The coating materials of the invention feature ease of handling, good processing properties, and high hiding power. Their pollutant content is low. They have good performance properties, such as high water resistance, good wet adhesion, high blocking resistance, good recoatability, and good flow on application. The equipment used is easily cleaned with water.

The coatings produced from the coating materials of the invention feature good stain resistance in conjunction with good scrub and burnish resistance. Moreover, the volatile organic compounds content of the coatings produced from the coating materials of the invention is generally low.

The invention is elucidated in more detail with the aid of the following examples, which should not be interpreted as being restrictive.

EXAMPLES

I. Preparation of the Polymer Dispersions 1 to 7 PD 1 to PD 7)

Example 1

Preparation of Polymer Dispersion 1

The following were charged to a polymerization vessel equipped with metering apparatus and temperature regulation:
Initial Charge:

| | |
|---|---|
| 201.24 g | demineralized water |
| 0.13 g | copper(II) sulfate (0.1% strength aqueous solution) |
| 3.25 g | Maranil A 20 (20% strength aqueous solution, sodium (n-($C_{10}$-$C_{13}$)alkylphenyl)sulfonate) |

This initial charge was then heated to 95° C. with stirring (150 rpm). Subsequently, with this temperature maintained, 36.33 g of feed 1 and, after a further 10 minutes under stirring, 10.92 g of feed 2 were added and the mixture was stirred for a further 5 minutes. Thereafter the remaining amounts of feed 1 and feed 2 were added in parallel over 2.5 hours.

Feed 1:

| | |
|---|---|
| 371.88 g | demineralized water |
| 6.50 g | Maphos 24 T ($C_{10}H_{21}O(CH_2CH_2O)_4$—$P(=O)(OH)_2$, BASF BTC) |
| 2.60 g | Sipomer PAM 100 ($CH_2=C(CH_3)C(=O)O(CH_2CH_2O)_7$—$P(=O)(OH)_2$, Rhodia) |
| 5.78 g | Dowfax 2A1 (45% strength aqueous solution, alkyldiphenyl oxide disulfonate) |
| 8.45 g | acrylic acid |
| 19.50 g | acrylamide (50% strength aqueous solution) |
| 362.70 g | n-butyl acrylate |
| 266.50 g | methyl methacrylate |

Feed 2:

| | |
|---|---|
| 31.20 g | sodium peroxodisulfate (2.5% strength aqueous solution) |

After the end of the addition, feed 1 was rinsed with 7.22 g of water. The polymerization mixture was stirred at 90° C. for a further 15 minutes. Then, in succession, 2.60 g of ammonia (25% strength aqueous solution) were added with 3.90 g of demineralized water over 15 minutes; 3.90 g of tert-butyl hydroperoxide (10% strength aqueous solution) were added with 5.92 g of demineralized water over 1 hour; and 4.96 g of acetone bisulfite (13.1% strength aqueous solution) were added with 9.30 g of demineralized water over one hour. The polymerization mixture was stirred for a further 15 minutes and cooled over 90 minutes to 30° C. Subsequently, in succession, 37.90 g of demineralized water, 4.35 g of Acticid MBS (5% strength aqueous solution), and 11.05 g of sodium hydroxide (10% strength aqueous solution) in 11.57 g of demineralized water were added and the polymerization mixture was cooled to room temperature.

Example 2

Preparation of Polymer Dispersion 2

The following were charged to a polymerization vessel equipped with metering apparatus and temperature regulation:
Initial Charge:

| | |
|---|---|
| 216.72 g | demineralized water |
| 0.14 g | copper(II) sulfate (0.1% strength aqueous solution) |
| 3.50 g | Maranil A 20 (20% strength aqueous solution, sodium (n-($C_{10}$-$C_{13}$)alkylphenyl)sulfonate) |

This initial charge was then heated to 95° C. with stirring (200 rpm). Subsequently, with this temperature maintained, 39.02 g of feed 1 and, after a further 10 minutes under stirring, 11.76 g of feed 2 were added and the mixture was stirred for a further 5 minutes. Thereafter the remaining amounts of feed 1 and feed 2 were added in parallel over 2.5 hours.
Feed 1:

| | |
|---|---|
| 398.97 g | demineralized water |
| 5.60 g | Maphos 10 T ((2-ethylhexyl) phosphate, BASF BTC) |
| 4.20 g | Sipomer PAM 300 |

-continued

| | |
|---|---|
| | $(CH_2=CH-C(=O)O(CH_2CH_2O)_{7-10}-P(=O)(OH)_2$, Rhodia) |
| 6.22 g | Dowfax 2A1 (45% strength aqueous solution, alkyldiphenyl oxide disulfonate) |
| 9.10 g | acrylic acid |
| 21.00 g | acrylamide (50% strength aqueous solution) |
| 389.90 g | n-butyl acrylate |
| 286.30 g | methyl methacrylate |

Feed 2:

| | |
|---|---|
| 33.60 g | sodium peroxodisulfate (2.5% strength aqueous solution) |

After the end of the addition, feed 1 was rinsed with 7.77 g of demineralized water. The polymerization mixture was stirred at 90° C. for a further 15 minutes. Then, in succession, 2.80 g of ammonia (25% strength aqueous solution) were added with 4.20 g of demineralized water over 15 minutes; 4.20 g of tert-butyl hydroperoxide (10% strength of aqueous solution) were added with 6.37 g of demineralized water over 1 hour; and 5.34 g of acetone bisulfite (13.1% strength aqueous solution) were added with 10.01 g of demineralized water over one hour. The polymerization mixture was stirred for a further 15 minutes and cooled over 90 minutes to 30° C. Subsequently, in succession, 40.81 g of demineralized water, 4.68 g of Acticid MBS (5% strength aqueous solution), and 11.90 g of sodium hydroxide (10% strength aqueous solution) with 12.46 g of demineralized water were added and the polymerization mixture was cooled to room temperature.

Example 3

Preparation of Polymer Dispersion 3 (Not Inventive)

The following were charged to a polymerization vessel equipped with metering apparatus and temperature regulation:
Initial Charge:

| | |
|---|---|
| 216.72 g | demineralized water |
| 0.14 g | copper(II) sulfate (0.1% strength aqueous solution) |
| 3.50 g | Maranil A 20 (20% strength aqueous solution, sodium (n-($C_{10}$-$C_{13}$)alkylphenyl)sulfonate) |

This initial charge was then heated to 95° C. with stirring (150 rpm). Subsequently, with this temperature maintained, 35.32 g of feed 1 and, after a further 10 minutes under stirring, 11.76 g of feed 2 were added and the mixture was stirred for a further 5 minutes. Thereafter the remaining amounts of feed 1 and feed 2 were added in parallel over 2.5 hours.
Feed 1:

| | |
|---|---|
| 267.17 g | demineralized water |
| 9.33 g | Dowfax 2A1 (45% strength aqueous solution, alkyldiphenyl oxide disulfonate) |
| 28.00 g | Lutensol TO 89 (20% strength aqueous solution of ethoxylated $C_{13}$-oxo-process alcohol, BASF) |
| 9.10 g | acrylic acid |
| 21.00 g | acrylamide (50% strength aqueous solution) |
| 392.00 g | n-butyl acrylate |
| 288.40 g | methyl methacrylate |

Feed 2:

| | |
|---|---|
| 33.60 g | sodium peroxodisulfate (2.5% strength aqueous solution) |

After the end of the addition, feed 1 was rinsed with 7.77 g of demineralized water. The polymerization mixture was stirred at 90° C. for a further 15 minutes. Then, in succession, 2.80 g of ammonia (25% strength aqueous solution) were added with 4.20 g of demineralized water over 15 minutes; 4.20 g of tert-butyl hydroperoxide (10% strength of aqueous solution) were added with 6.37 g of demineralized water over 1 hour; and 5.34 g of acetone bisulfite (13.1% strength aqueous solution) were added with 10.01 g of demineralized water over one hour. The polymerization mixture was stirred for a further 15 minutes and cooled over 90 minutes to 30° C. Subsequently, in succession, 40.81 g of demineralized water, 4.68 g of Acticid MBS (5% strength aqueous solution), and 11.90 g of sodium hydroxide (10% strength aqueous solution) with 12.46 g of demineralized water were added and the polymerization mixture was cooled to room temperature.

Example 4

Preparation of Polymer Dispersion 4 (Not Inventive)

The following were charged to a polymerization vessel equipped with metering apparatus and temperature regulation:
Initial Charge:

| | |
|---|---|
| 185.76 g | demineralized water |
| 0.12 g | copper(II) sulfate (0.1% strength aqueous solution) |
| 3.00 g | Maranil A 20 (20% strength aqueous solution, sodium (n-($C_{10}$-$C_{13}$)alkylphenyl)sulfonate) |

This initial charge was then heated to 95° C. with stirring (150 rpm). Subsequently, with this temperature maintained, 29.95 g of feed 1 and, after a further 10 minutes under stirring, 10.08 g of feed 2 were added and the mixture was stirred for a further 5 minutes. Thereafter the remaining amounts of feed 1 and feed 2 were added in parallel over 2.5 hours.
Feed 1:

| | |
|---|---|
| 243.74 g | demineralized water |
| 4.80 g | Sipomer PAM 100 $(CH_2=C(CH_3)C(=O)O(CH_2CH_2O)_7-P(=O)(OH)_2$, Rhodia) |
| 8.00 g | Dowfax 2A1 (45% strength aqueous solution, alkyldiphenyl oxide disulfonate) |
| 7.80 g | acrylic acid |
| 18.00 g | acrylamide (50% strength aqueous solution) |
| 333.6 g | n-butyl acrylate |
| 244.80 g | methyl methacrylate |

Feed 2:

| | |
|---|---|
| 28.80 g | sodium peroxodisulfate (2.5% strength aqueous solution) |

After the end of the addition, feed 1 was rinsed with 6.66 g of demineralized water. The polymerization mixture was stirred at 90° C. for a further 15 minutes. Then, in succession, 2.40 g of ammonia (25% strength aqueous solution) were added with 3.60 g of water over 15 minutes; 3.60 g of tert-butyl hydroperoxide (10% strength aqueous solution) were added with 5.46 g of demineralized water over 1 hour; and 4.58 g of acetone bisulfite (13.1% strength aqueous solution) were added with 8.58 g of demineralized water over one hour. The polymerization mixture was stirred for a further 15 minutes and cooled over 90 minutes to 30° C. Subsequently, in succession, 34.98 g of demineralized water, 4.01 g of Acticid MBS (5% strength aqueous solution), and 10.20 g of sodium hydroxide (10% strength aqueous solution) with 10.68 g of demineralized water were added and the polymerization mixture was cooled to room temperature.

Example 5

Preparation of Polymer Dispersion 5 (Not Inventive)

The following were charged to a polymerization vessel equipped with metering apparatus and temperature regulation:
Initial Charge:

| | |
|---|---|
| 185.76 g | demineralized water |
| 0.12 g | copper(II) sulfate (0.1% strength aqueous solution) |
| 3.00 g | Maranil A 20 (20% strength aqueous solution, sodium (n-($C_{10}$-$C_{13}$)alkylphenyl)sulfonate) |

This initial charge was then heated to 95° C. with stirring (150 rpm). Subsequently, with this temperature maintained, 29.95 g of feed 1 and, after a further 10 minutes under stirring, 10.08 g of feed 2 were added and the mixture was stirred for a further 5 minutes. Thereafter the remaining amounts of feed 1 and feed 2 were added in parallel over 2.5 hours.
Feed 1:

| | |
|---|---|
| 243.74 g | demineralized water |
| 4.80 g | Sipomer PAM 300 ($CH_2$=CH—C(=O)O($CH_2CH_2O$)$_{7\text{-}10}$—P(=O)(OH)$_2$, Rhodia) |
| 8.00 g | Dowfax 2A1 (45% strength aqueous solution, alkyldiphenyl oxide disulfonate) |
| 7.80 g | acrylic acid |
| 18.00 g | acrylamide (50% strength aqueous solution) |
| 333.60 g | n-butyl acrylate |
| 244.80 g | methyl methacrylate |

Feed 2:

| | |
|---|---|
| 28.80 g | sodium peroxodisulfate (2.5% strength aqueous solution) |

After the end of the addition, feed 1 was rinsed with 6.66 g of demineralized water. The polymerization mixture was stirred at 90° C. for a further 15 minutes. Then, in succession, 2.40 g of ammonia (25% strength aqueous solution) were added with 3.60 g of demineralized water over 15 minutes; 3.60 g of tert-butyl hydroperoxide (10% strength aqueous solution) were added with 5.46 g of demineralized water over 1 hour; and 4.58 g of acetone bisulfite (13.1% strength aqueous solution) were added with 8.58 g of demineralized water over one hour. The polymerization mixture was stirred for a further 15 minutes and cooled over 90 minutes to 30° C. Subsequently, in succession, 34.98 g of demineralized water, 4.01 g of Acticid MBS (5% strength aqueous solution), and 10.20 g of sodium hydroxide (10% strength aqueous solution) with 10.68 g of demineralized water were added and the polymerization mixture was cooled to room temperature.

Example 6

Preparation of Polymer Dispersion 6 (Not Inventive)

The following were charged to a polymerization vessel equipped with metering apparatus and temperature regulation:
Initial Charge:

| | |
|---|---|
| 216.72 g | demineralized water |
| 0.14 g | copper(II) sulfate (0.1% strength aqueous solution) |
| 3.50 g | Maranil A 20 (20% strength aqueous solution, sodium (n-($C_{10}$-$C_{13}$)alkylphenyl)sulfonate) |

This initial charge was then heated to 95° C. with stirring (150 rpm). Subsequently, with this temperature maintained, 35.32 g of feed 1 and, after a further 10 minutes under stirring, 11.76 g of feed 2 were added and the mixture was stirred for a further 5 minutes. Thereafter the remaining amounts of feed 1 and feed 2 were added in parallel over 2.5 hours.
Feed 1:

| | |
|---|---|
| 289.57 g | demineralized water |
| 5.60 g | Maphos 10 T ((2-ethylhexyl) phosphate, BASF BTC) |
| 9.33 g | Dowfax 2A1 (45% strength aqueous solution, alkyldiphenyl oxide disulfonate) |
| 9.10 g | acrylic acid |
| 21.00 g | acrylamide (50% strength aqueous solution) |
| 392.00 g | n-butyl acrylate |
| 288.40 g | methyl methacrylate |

Feed 2:

| | |
|---|---|
| 33.60 g | sodium peroxodisulfate (2.5% strength aqueous solution) |

After the end of the addition, feed 1 was rinsed with 7.77 g of demineralized water. The polymerization mixture was stirred at 90° C. for a further 15 minutes. Then, in succession, 2.80 g of ammonia (25% strength aqueous solution) were added with 4.20 g of demineralized water over 15 minutes; 4.20 g of tert-butyl hydroperoxide (10% strength aqueous solution) were added with 6.37 g of demineralized water over 1 hour; and 5.34 g of acetone bisulfite (13.1% strength aqueous solution) were added with 10.01 g of demineralized water over one hour. The polymerization mixture was stirred for a further 15 minutes and cooled over 90 minutes to 30° C. Subsequently, in succession, 40.81 g of demineralized water, 4.68 g of Acticid MBS (5% strength aqueous solution), and 11.90 g of sodium hydroxide (10% strength aqueous solution) with 12.46 g of demineralized water were added and the polymerization mixture was cooled to room temperature.

Example 7

Preparation of Polymer Dispersion 7 (Not Inventive)

The following were charged to a polymerization vessel equipped with metering apparatus and temperature regulation:

Initial Charge:

| | |
|---|---|
| 216.72 g | demineralized water |
| 0.14 g | copper(II) sulfate (0.1% strength aqueous solution) |
| 3.50 g | Maranil A 20 (20% strength aqueous solution, sodium (n-($C_{10}$-$C_{13}$)alkylphenyl)sulfonate) |

This initial charge was then heated to 95° C. with stirring (150 rpm). Subsequently, with this temperature maintained, 35.32 g of feed 1 and, after a further 10 minutes under stirring, 11.76 g of feed 2 were added and the mixture was stirred for a further 5 minutes. Thereafter the remaining amounts of feed 1 and feed 2 were added in parallel over 2.5 hours.

Feed 1:

| | |
|---|---|
| 289.57 g | demineralized water |
| 5.60 g | Maphos 43 T (monophosphate of ethoxylated $C_{13}$-$C_{15}$-oxo-process alcohol with 3 EO, BASF BTC) |
| 9.33 g | Dowfax 2A1 (45% strength aqueous solution, alkyldiphenyl oxide disulfonate) |
| 9.10 g | acrylic acid |
| 21.00 g | acrylamide (50% strength aqueous solution) |
| 392.00 g | n-butyl acrylate |
| 288.40 g | methyl methacrylate |

Feed 2:

| | |
|---|---|
| 33.60 g | sodium peroxodisulfate (2.5% strength aqueous solution) |

After the end of the addition, feed 1 was rinsed with 7.77 g of demineralized water. The polymerization mixture was stirred at 90° C. for a further 15 minutes. Then, in succession, 2.80 g of ammonia (25% strength aqueous solution) were added with 4.20 g of demineralized water over 15 minutes; 4.20 g of tert-butyl hydroperoxide (10% strength aqueous solution) were added with 6.37 g of demineralized water over 1 hour; and 5.34 g of acetone bisulfite (13.1% strength aqueous solution) were added with 10.01 g of demineralized water over one hour. The polymerization mixture was stirred for a further 15 minutes and cooled over 90 minutes to 30° C. Subsequently, in succession, 30.81 g of demineralized water, 4.68 g of Acticid MBS (5% strength aqueous solution), and 11.90 g of sodium hydroxide (10% strength aqueous solution) with 12.46 g of demineralized water were added and the polymerization mixture was cooled to room temperature.

II. Preparation of the Coating Materials 1 to 7 (CM 1 to CM 7)

The individual components were metered in, in the amount (parts by weight) and sequence as indicated in Table A, with stirring using a toothed disk stirrer. Following the addition of defoamer 1, the mixture was homogenized at low speed for 10 minutes. Then the addition of the components was continued. After the addition of the matting agent, the speed was increased to 2000 rpm and dispersion was carried out for 20 minutes until the pigment particles had a diameter <50 μm. Defoamer 2 was added, and the mixture was homogenized at reduced speed for a further 5 minutes. Then the remaining components were added, with stirring, and, if necessary, the batch was cooled to room temperature.

TABLE A

Formulation of the coating materials

| Component | Name (Manufacturer) | Amount [parts by weight] |
|---|---|---|
| Water | — | 100 |
| Dispersant | Pigment Disperser ® MD 20 (BASF) | 12 |
| Dispersant | tri-potassium polyphosphate (25% strength solution) (Sinoreagent) | 8 |
| Preservative | Acticide SPX (Thor Chemicals) | 1 |
| Defoamer 1 | DS 065 (Dow Corning) | 2 |
| Thickener 1 | Aquaflow NHS 300 (Aqualon) | 9 |
| Titanium dioxide pigment | Tronox CR 828 (Kerr McGee) | 200 |
| Filler 1 | Tonerde DB-1 (China Clay Co, Ltd.) | 52 |
| Filler 2 | $CaCO_3$ 700 (Fine Chemicals Industry Co, Ltd.) | 52 |
| Matting agent | Celite 499 (Imerys) | 52 |
| Defoamer 2 | Dispelair CF 246 (Blackburn Chemicals) | 2 |
| Polymer dispersion (Solids fraction 50% by weight) | from examples 2 to 7 | 350 |
| Polymer (opaque) | Opaque Ultra (Rohm & Haas) | 60 |
| pH-Regulator | sodium hydroxide solution, 10% strength by weight | 0.5 |
| Thickener 2 | BA905, 50% strength by weight in water | 2.0 |
| Water | — | 97.5 |
| Total | — | 1000 |

III. Performance Examples

1. Stain Resistance

The stain resistance of the coatings was determined in accordance with the modified method "BALTM048" of BASF Australia Ltd. The inventive coating materials under investigation were applied to black PVC panels in a wet film thickness of 125 μm. The samples were cured at 23° C. for 24 h. Then a further layer of the coating material in a wet film thickness of 125 μm was applied to the first layer, to give a two-layer sample. This was cured at 23° C. for a further 7 days.

The stain resistance was tested with respect to Artline red stamp ink, Parker Quink blue pen ink, a 10% by weight coffee powder solution, black tea, crayon, and lipstick. Liquid stains were applied to the coating layer on a strip 1 to 2 cm wide, in an amount of approximately 1 ml per stain. Crayon and lipstick were applied to a strip of 1 to 2 cm. The stains were left on the coating layers for 5 minutes and then rinsed off in order to remove excess stain. Two sample panels were produced for each coating material.

The sample panels were fixed on a Sheen wet abrasion scrub tester 903. A sponge (Oates Clean) cut to size was saturated with 50 ml of a 1% strength Teric® N9 solution. The sample was washed 200 times with this solution. In order to ensure that the sponge was wet throughout the washing procedure, a dropping funnel applied 4 drops of Teric® N9 per minute to one end of the sample panel. After the washing, the sample panels were rinsed off and dried at 23° C. for 24 hours. The results of the tests are given in Table 1 in the form of the "dE" values found. The "dE value" corresponds to the difference in color between an unstained and washed region and the stained and washed region of a sample, measured using a data color spectrophotometer. For each sample, three points of each stained region are measured. The figures reported in Table 1 are the average value from the three results for each of the two samples investigated.

TABLE 1 dE values.

|  | CM 1 | CM 2 | CM 3*) | CM 4*) | CM 5*) | CM 6*) | CM 7*) |
|---|---|---|---|---|---|---|---|
| Stamp ink | 4.45 | 0.88 | 5.75 | 5.46 | 5.59 | 3.82 | 3.80 |
| Pen ink | 0.22 | 0.16 | 0.10 | 0.13 | 0.24 | 0.38 | 0.49 |
| Coffee | 0.81 | 1.08 | 1.85 | 1.51 | 1.57 | 2.16 | 0.83 |
| Tea | 0.96 | 0.75 | 4.04 | 2.72 | 1.88 | 1.28 | 1.48 |
| Crayon | 0.80 | 1.88 | 0.48 | 0.25 | 0.65 | 0.53 | 0.68 |
| Lipstick | 0.18 | 0.51 | 0.08 | 0.24 | 0.38 | 1.33 | 0.55 |
| Σ | 7.42 | 5.26 | 12.30 | 10.31 | 10.31 | 9.50 | 7.83 |

*)Comparative example

2. Gloss and Burnish Resistance

The burnish resistance of the coatings is determined from the change in gloss.

For this purpose the coating composition is applied with a slot width of 125 μm to a glass plate, and dried at room temperature for 7 days.

The gloss of the coating is determined in accordance with DIN EN ISO 2813. For this purpose the test specimen is inserted into a calibrated reflectometer (Byk-Gardner, Tri Head) and the reflectometer value is determined at incident angles of 20, 60, and 85°. The reflectometer value found is a measure of the gloss (the higher the value, the higher the gloss).

Subsequently the test specimen is fixed on a Sheen wet abrasion scrub tester 903. The cork block (85 mm×40 mm×30 mm) of the instrument is wrapped round twice with a dry cloth (chux superwipe, 300 mm×200 mm). 200 scrub cycles are carried out. Subsequently the test specimen is carefully freed from abraded material, left to stand at room temperature for 5 minutes, and then measured again for its gloss.

TABLE 2

Gloss determined at an angle of 20°

|  | before | after | Δ (gloss) |
|---|---|---|---|
| CM 1 | 1.4 | 1.4 | 0.0 |
| CM 2 | 1.4 | 1.5 | 0.1 |
| CM 3*) | 1.4 | 1.7 | 0.3 |
| CM 4*) | 1.4 | 1.4 | 0.0 |
| CM 5*) | 1.4 | 1.5 | 0.1 |
| CM 6*) | 1.4 | 1.4 | 0.0 |
| CM 7*) | 1.5 | 1.6 | 0.1 |

*)Comparative example

TABLE 3

Gloss determined at an angle of 60°

|  | before | after | Δ (gloss) |
|---|---|---|---|
| CM 1 | 4.3 | 5.0 | 0.7 |
| CM 2 | 4.1 | 5.1 | 1.0 |
| CM 3*) | 4.1 | 7.7 | 3.6 |
| CM 4*) | 3.7 | 4.0 | 0.3 |
| CM 5*) | 3.8 | 5.2 | 1.4 |
| CM 6*) | 3.7 | 5.2 | 1.5 |
| CM 7*) | 4.0 | 7.1 | 3.1 |

*)Comparative example

TABLE 4

Gloss determined at an angle of 85°

|  | before | after | Δ (gloss) |
|---|---|---|---|
| CM 1 | 8.5 | 13.7 | 5.2 |
| CM 2 | 8.8 | 15.9 | 7.1 |
| CM 3*) | 7.5 | 21.0 | 13.5 |
| CM 4*) | 6.4 | 13.3 | 6.9 |
| CM 5*) | 6.7 | 15.7 | 9.0 |
| CM 6*) | 6.7 | 15.6 | 8.9 |
| CM 7*) | 6.8 | 17.8 | 9.0 |

*)Comparative example

From the difference found in the gloss (Δ) before and after the burnishing procedure it is possible to determine the burnish resistance of the coatings. The lower the value of Δ (gloss), the higher the burnish resistance.

2. Scrub Resistance (ASTM D 2486)

The scrub resistance (abrasion resistance) was determined in accordance with ASTM D 2486 using a Gardner scrub machine and a standardized scrub medium (abrasive type SC-2).

The coating materials were applied with a box-type coating bar (slot width 175 μm) to Leneta charts. The charts were then dried in a controlled-climate chamber for 14 days at 23° C. and 50% relative humidity. The dry film thickness of the coatings obtained is about 50 μm.

The films obtained are underlaid centrally with a sheet metal strip 250 μm thick. Then the standardized scrub medium is applied, and a nylon brush is used for scrubbing until the coating has been scrubbed through at the point where the sheet metal has been underlaid.

Table 5 reproduces the number of double rubs (back-and-forth strokes) required to scrub the coating right through at one point, averaged over 3 charts in each case.

TABLE 5

Scrub resistance

|  | CM 1 | CM 2 | CM 3*) | CM 4*) | CM 5*) | CM 6*) | CM 7*) |
|---|---|---|---|---|---|---|---|
| Double rubs | 470 | 449 | 478 | 370 | 480 | 190 | 390 |

*)Comparative example

III. Preparation of the Polymer Dispersions 8 to 14 (PD 8 to PD 14)

Example 8

Preparation of Polymer Dispersion 8

The following were charged to a polymerization vessel equipped with metering apparatus and temperature regulation:

Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.

Feed 1:

| | |
|---|---|
| 371.42 g | demineralized water |
| 5.77 g | Dowfax 2A1 (45% strength aqueous solution, alkyldiphenyl oxide disulfonate) |
| 6.46 g | Maphos 24 T ($C_{10}H_{21}O(CH_2CH_2O)_4$—$P(\!=\!O)(OH)_2$, BASF BTC) |
| 5.20 g | Sipomer PAM 100 ($CH_2\!=\!C(CH_3)C(\!=\!O)O(CH_2CH_2O)_7$—$P(\!=\!O)(OH)_2$, Rhodia) |
| 7.15 g | acrylic acid |
| 19.50 g | acrylamide (50% strength aqueous solution) |
| 362.70 g | n-butyl acrylate |
| 265.20 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes. Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (biocide from Thor Chemie, 5% strength aqueous solution), 1.38 g of Acticid MV (biocide from Thor Chemie, 1.5% strength aqueous solution), and 28.14 g of demineralized water were added.

Example 9

Preparation of Polymer Dispersion 9

The following were charged to a polymerization vessel equipped with metering apparatus and temperature regulation:

Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.

Feed 1:

| | |
|---|---|
| 371.42 g | demineralized water |
| 5.77 g | Dowfax 2A1 (45% strength aqueous solution, alkyldiphenyl oxide disulfonate) |
| 6.46 g | Maphos 24 T ($C_{10}H_{21}O(CH_2CH_2O)_4$—$P(\!=\!O)(OH)_2$, BASF BTC) |
| 5.85 g | Sipomer PAM 100 ($CH_2\!=\!C(CH_3)C(\!=\!O)O(CH_2CH_2O)_7$—$P(\!=\!O)(OH)_2$, Rhodia) |
| 8.45 g | acrylic acid |
| 19.50 g | acrylamide (50% strength aqueous solution) |
| 362.70 g | n-butyl acrylate |
| 263.25 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes. Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (5% strength aqueous solution), 1.38 g of Acticid MV (1.5% strength aqueous solution), and 28.14 g of demineralized water were added.

Example 10

Preparation of Polymer Dispersion 10

The following were charged to a polymerization vessel equipped with metering apparatus and temperature regulation:

Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.

Feed 1:

| | |
|---|---|
| 368.81 g | demineralized water |
| 5.77 g | Dowfax 2A1 (45% strength aqueous solution, alkyldiphenyl oxide disulfonate) |
| 3.90 g | Maphos 24 T ($C_{10}H_{21}O(CH_2CH_2O)_4$—$P(\!=\!O)(OH)_2$, BASF BTC) |

-continued

| | |
|---|---|
| 5.85 g | Sipomer PAM 100<br>($CH_2$=$C(CH_3)C$(=O)O($CH_2CH_2O$)$_7$—P(=O)(OH)$_2$, Rhodia) |
| 7.15 g | acrylic acid |
| 19.50 g | acrylamide (50% strength aqueous solution) |
| 362.70 g | n-butyl acrylate |
| 264.55 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes. Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (5% strength aqueous solution), 1.38 g of Acticid MV (1.5% strength aqueous solution), and 28.14 g of demineralized water were added.

Example 11

Preparation of Polymer Dispersion 11

The following were charged to a polymerization vessel equipped with metering apparatus and temperature regulation:
Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.
Feed 1:

| | |
|---|---|
| 368.81 g | demineralized water |
| 5.77 g | Dowfax 2A1 (45% strength aqueous solution, alkyldiphenyl oxide disulfonate) |
| 3.90 g | Maphos 24 T<br>($C_{10}H_{21}O(CH_2CH_2O)_4$—P(=O)(OH)$_2$, BASF BTC) |
| 4.88 g | Sipomer PAM 100<br>($CH_2$=$C(CH_3)C$(=O)O($CH_2CH_2O$)$_7$—P(=O)(OH)$_2$, Rhodia) |
| 7.15 g | acrylic acid |
| 19.50 g | acrylamide (50% strength aqueous solution) |
| 362.70 g | n-butyl acrylate |
| 265.52 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes. Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (5% strength aqueous solution), 1.38 g of Acticid MV (1.5% strength aqueous solution), and 28.14 g of demineralized water were added.

Example 12

Preparation of Polymer Dispersion 12 (Not Inventive)

The following were charged to a polymerization vessel equipped with metering apparatus and temperature regulation:
Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.
Feed 1:

| | |
|---|---|
| 371.42 g | demineralized water |
| 5.77 g | Dowfax 2A1 (45% strength aqueous solution, alkyldiphenyl oxide disulfonate) |
| 6.46 g | Maphos 24 T<br>($C_{10}H_{21}O(CH_2CH_2O)_4$—P(=O)(OH)$_2$, BASF BTC) |
| 7.15 g | acrylic acid |
| 19.50 g | acrylamide (50% strength aqueous solution) |
| 365.70 g | n-butyl acrylate |
| 267.40 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes.

Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (5% strength aqueous solution), 1.38 g of Acticid MV (1.5% strength aqueous solution), and 28.14 g of demineralized water were added.

Example 13

Preparation of Polymer Dispersion 13 (Not Inventive)

The following were charged to a polymerization vessel equipped with metering apparatus and temperature regulation:
Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.
Feed 1:

| | |
|---|---|
| 364.83 g | demineralized water |
| 5.77 g | Dowfax 2A1 (45% strength aqueous solution, alkyldiphenyl oxide disulfonate) |
| 5.85 g | Sipomer PAM 100 (CH$_2$=C(CH$_3$)C(=O)O(CH$_2$CH$_2$O)$_7$—P(=O)(OH)$_2$, Rhodia) |
| 7.15 g | acrylic acid |
| 19.50 g | acrylamide (50% strength aqueous solution) |
| 362.70 g | n-butyl acrylate |
| 264.55 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes. Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (5% strength aqueous solution), 1.38 g of Acticid MV (1.5% strength aqueous solution), and 28.14 g of demineralized water were added.

Example 14

Preparation of Polymer Dispersion 14 (Not Inventive)

The following were charged to a polymerization vessel equipped with metering apparatus and temperature regulation:
Initial Charge:

| | |
|---|---|
| 197.61 g | demineralized water |
| 17.73 g | polystyrene seed latex, (polymer solids content 33% by weight, number-average particle diameter approximately 30 nm) |

This initial charge was then heated to 95° C. with stirring (150 rpm). Subsequently, with this temperature maintained and with stirring, 1.13 g of feed 2 were added and the mixture was stirred for a further 5 minutes. Thereafter feed 1 and the remaining amount of feed 2 were added in parallel over 2.75 hours.
Feed 1:

| | |
|---|---|
| 364.83 g | demineralized water |
| 5.77 g | Dowfax 2A1 (45% strength aqueous solution, alkyldiphenyl oxide disulfonate) |
| 7.15 g | acrylic acid |
| 19.50 g | acrylamide (50% strength aqueous solution) |
| 365.69 g | n-butyl acrylate |
| 267.41 g | methyl methacrylate |

Feed 2:

| | |
|---|---|
| 11.26 g | sodium peroxodisulfate (7% strength aqueous solution) |

After the end of the addition, feed 1 was rinsed with 14.15 g of water. The polymerization mixture was stirred at 95° C. for a further 15 minutes. The polymerization mixture was cooled to 90° C., during which 2.59 g of ammonia (25% strength aqueous solution) were added over 15 minutes. Thereafter, over 1 hour, 3.90 g of tert-butyl hydroperoxide (10% strength aqueous solution) and 4.70 g of acetone bisulfite (13.1% strength aqueous solution) were added. The polymerization mixture was cooled to room temperature. During this procedure, 18.11 g of sodium hydroxide (10% strength aqueous solution) were added. Subsequently, in succession, 4.35 g of Acticid MBS (5% strength aqueous solution), 1.38 g of Acticid MV (1.5% strength aqueous solution), and 28.14 g of demineralized water were added.

IV. Preparation of the Coating Materials 8 to 14 (CM 8 to CM 14)

The individual components were metered in, in the amount (parts by weight) and sequence as indicated in Table B, with stirring using a toothed disk stirrer. Following the addition of defoamer 1, the mixture was homogenized at low speed for 10 minutes. Then the addition of the components was continued. After the addition of the matting agent, the speed was increased to 2000 rpm and dispersion was carried out for 20 minutes until the pigment particles had a diameter <50 µm. Thickener 3 was added, and the mixture was homogenized at reduced speed for a further 5 minutes. Then the remaining components were added, with stirring, and, if necessary, the batch was cooled to room temperature.

TABLE B

Formulation of coating materials CM 8 to CM 14

| Component | CM 8 | CM 9 | CM 10 | CM 11 | CM 12*) | CM 13*) | CM 14*) |
|---|---|---|---|---|---|---|---|
| Water | 200.0 | 200.0 | 200.0 | 200.0 | 200.0 | 200.0 | 200.0 |
| Dispersant 1 | 12.0 | 12.0 | 12.0 | 12.0 | 12.0 | 12.0 | 12.0 |
| Preservative 1 | 1.0 | 1.0 | 1.0 | 1.0 | 1.0 | 1.0 | 1.0 |
| Thickener 1 | 1.0 | 1.0 | 1.0 | 1.0 | 1.0 | 1.0 | 1.0 |
| Thickener 2 | 4.0 | 4.0 | 4.0 | 4.0 | 4.0 | 4.0 | 4.0 |
| Defoamer 1 | 3.0 | 3.0 | 3.0 | 3.0 | 3.0 | 3.0 | 3.0 |
| Titanium dioxide pigment | 180.0 | 180.0 | 180.0 | 180.0 | 180.0 | 180.0 | 180.0 |
| Diatomaceous earth | 10.0 | 10.0 | 10.0 | 10.0 | 10.0 | 10.0 | 10.0 |
| Matting agent | 15.0 | 15.0 | 15.0 | 15.0 | 15.0 | 15.0 | 15.0 |
| Glass Bubbles S22 | 5.0 | 5.0 | 5.0 | 5.0 | 5.0 | 5.0 | 5.0 |
| Filler 1 | 35.0 | 35.0 | 35.0 | 35.0 | 35.0 | 35.0 | 35.0 |
| Filler 2 | 90.0 | 90.0 | 90.0 | 90.0 | 90.0 | 90.0 | 90.0 |
| ZnO zinc white | 23.0 | 23.0 | 23.0 | 23.0 | 23.0 | 23.0 | 23.0 |
| Thickener 3 | 8.0 | 8.0 | 8.0 | 8.0 | 8.0 | 8.0 | 8.0 |
| PM 8 (SF 48.6% by wt.) | 352.8 | — | — | — | — | — | — |
| PM 9 (SF 48.2% by wt.) | — | 355.7 | — | — | — | — | — |
| PM 10 (SF 48.4% by wt.) | — | — | 354.3 | — | — | — | — |
| PM 11 (SF 49.1% by wt.) | — | — | — | 349.2 | — | — | — |
| PM 12 (SF 49.1% by wt.) | — | — | — | — | 349.2 | — | — |
| PM 13 (SF 49.1% by wt.) | — | — | — | — | — | 349.2 | — |
| PM 14 (SF 49.4% by wt.) | — | — | — | — | — | — | 347.1 |
| Film-forming assistant 1 | 10.0 | 10.0 | 10.0 | 10.0 | 10.0 | 10.0 | 10.0 |
| Water | 50.2 | 47.3 | 48.7 | 53.8 | 53.8 | 53.8 | 55.9 |
| Total | 1000.0 | 1000.0 | 1000.0 | 1000.0 | 1000.0 | 1000.0 | 1000.0 |

*)Comparative example
SF: Solids fraction
Dispersant 1 Pigmentverteiler MD 20, 25% form, from BASF
Preservative 1 Acticid SPX, from Thor Chemie
Thickener 1 Collacral ® LR 8989, 20% form, from BASF
Thickener 2 Optigel ® CK, Rockwood Additives
Defoamer 1 Byk ® 037, Byk
Titanium dioxide pigment Tronox ® CR 828, from Tronox
Diatomaceous earth Celite ® 281, from World Minerals
Matting agent Optimatt ® 2550, from World Minerals
Glass Bubbles S22 from 3M Deutschland
Filler 1 Minex ® 10, from Unimin Speciality Chemicals
Filler 2 Minex ® 4, from Unimin Speciality Chemicals
Thickener 3 Collacral ® LR 8990, 40% form, from BASF
Film-forming assistant 1 Optifilm Enhancer 300, from Eastman Chemicals V. Performance Examples of Coating Materials CM 8 to CM 14 (CM 8 to CM 14)

V.1 Burnish Resistance

Coating materials CM 8, CM 9, CM 10, CM 11, CM 12, CM 13, and CM 14 were drawn down with a slot width of 200 µm onto Leneta film (PVC) and were dried for 7 days at 23° C. and 50% relative humidity. Thereafter the gloss of the films was measured at incident angles of 20, 60, and 85°, using a calibrated reflectometer, in accordance with DIN EN ISO 2813. The films were then clamped into an abrasion device in accordance with DIN EN ISO 11998. In place of the abrading pad, a sponge wrapped with a cotton cloth was used, and the film was subjected to dry scrubbing with 500 double rubs. It was then wiped, and the gloss at 20°, 60°, and 85° was determined again. The results are summarized in Table 6.

TABLE 6

Burnish resistance

| | CM 8 | CM 9 | CM 10 | CM 11 | CM 12*) | CM 13*) | CM 14*) |
|---|---|---|---|---|---|---|---|
| Gloss before 20° | 1.1 | 1.1 | 1.1 | 1.1 | 1.1 | 1.1 | 1.1 |
| Gloss after 20° | 1.1 | 1.1 | 1.1 | 1.1 | 1.1 | 1.1 | 1.1 |
| Δ gloss | 0.0 | 0.0 | 0.0 | 0.0 | 0.0 | 0.0 | 0.0 |
| Gloss before 60° | 2.6 | 2.6 | 2.6 | 2.6 | 2.7 | 2.6 | 2.7 |
| Gloss after 60° | 2.6 | 2.7 | 2.8 | 2.8 | 2.8 | 2.8 | 2.8 |
| Δ gloss | 0.0 | 0.1 | 0.2 | 0.2 | 0.1 | 0.2 | 0.1 |
| Gloss before 85° | 1.1 | 1.2 | 1.2 | 1.1 | 1.2 | 1.2 | 1.3 |
| Gloss after 85° | 1.5 | 1.6 | 1.7 | 1.7 | 1.7 | 1.7 | 1.8 |
| Δ gloss | 0.4 | 0.4 | 0.5 | 0.6 | 0.5 | 0.5 | 0.5 |

From the difference found in the gloss (Δ) before and after the burnishing procedure it is possible to determine the burnish resistance of the coatings. The lower the value of Δ (gloss), the higher the burnish resistance.

V.2 Wet Abrasion (Scrub Resistance)

Coating materials CM 8, CM 9, CM 10, and CM 11 were applied with a slot width of 400 μm to Leneta film (PVC). The coating was dried for 7 days at 23° C. and 50% relative humidity. The wet abrasion resistance for coating materials CM 8, CM 9, CM 10, and CM 11 was determined in accordance with DIN EN ISO 11998. Evaluation was based on classification into one of 5 classes:

Class 1<5 μm in 200 scrub cycles
Class 2≧5 μm and <20 μm in 200 scrub cycles
Class 3≧20 μm and <70 μm in 200 scrub cycles
Class 4<70 μm in 40 scrub cycles
Class 5≧70 μm in 40 scrub cycles The results are summarized in Table 7.

TABLE 7

Scrub resistance

| | Coating material | | | |
|---|---|---|---|---|
| | CM 8 | CM 9 | CM 10 | CM 11 |
| Average in μm | 5 | 8 | 7 | 7 |
| Class | 2 | 2 | 2 | 2 |

V.3 Stain Resistance

The coating materials were drawn down in 2 coats each with 120 μm slot width onto Leneta film, and dried for 7 days at 23° C. and 50% relative humidity. Then the following test fluids were applied to the surface, in a quantity of approximately 1 ml: black tea, coffee solution (coffee powder, 4% strength), red wine, beetroot, lipstick 1 (Creamy and Care, Manhattan), lipstick 2 (X-treme Last and Shine, Manhattan), mustard (Tomy medium-sharp), and ketchup (Knorr). After an exposure time of 5 minutes, the test substances were washed off and the film was clamped into a scrub apparatus. Scrub pad and scrub track were moistened with 4 ml of 0.25% strength solution of Marlon A 350 (alkylbenzenesulfonate-based surfactant from Sasol Olefins & Surfactants, Hamburg, Germany), and scrubbing took place with 100 double rubs. After rinsing off and drying, Lab values were measured at the soiled and unsoiled locations, and from these measurements the color difference "delta E" was calculated. For each stain, 2 measurement values were recorded, and, for the white comparison area, 3 measurements were recorded, and the measurements were averaged. A total of 3 films per color were tested in this way, and the resulting "delta E" values were again averaged. The smaller the "delta E" value, the better the stain resistance and the lower the permanent discoloration of the film. The results are summarized in Table 8.

TABLE 8

Stain resistance

| delta E | CM 8 | CM 9 | CM 10 | CM 11 | CM 12*) | CM 13*) | CM 14*) |
|---|---|---|---|---|---|---|---|
| delta E black tea | 0.48 | 0.44 | 0.46 | 0.32 | 0.78 | 1.01 | 1.22 |
| delta E coffee | 0.73 | 0.78 | 0.72 | 0.59 | 0.97 | 1.21 | 2.06 |
| delta E red wine | 0.11 | 0.11 | 0.16 | 0.15 | 0.26 | 0.17 | 0.23 |
| delta E beetroot | 1.01 | 1.19 | 1.13 | 1.03 | 1.54 | 1.8 | 2.55 |
| delta E lipstick 1 | 0.18 | 0.3 | 0.22 | 0.25 | 0.38 | 0.36 | 0.26 |
| delta E lipstick 2 | 0.59 | 0.4 | 0.4 | 0.36 | 0.62 | 0.3 | 0.43 |
| delta E mustard | 0.25 | 0.25 | 0.27 | 0.23 | 0.21 | 0.13 | 0.18 |
| delta E ketchup | 0.07 | 0.19 | 0.19 | 0.18 | 0.37 | 0.14 | 0.14 |
| Σ | 3.42 | 3.66 | 3.55 | 3.11 | 5.13 | 5.12 | 7.07 |
| Average of 8 delta E | 0.43 | 0.46 | 0.44 | 0.39 | 0.64 | 0.64 | 0.88 |

*)Comparative example

It is seen that the coating materials of the invention have a better stain resistance than the comparative coating materials.

The invention claimed is:

1. A method of producing a coating material comprising blending a polymer dispersion (PD) comprising:
   i) at least one polymer (P) obtained by free-radical emulsion polymerization of
   at least one ethylenically unsaturated monomer (M1) and
   at least one monomer (M2) different from (M1) and selected from the group consisting of esters of phosphoric acid with unalkoxylated or alkoxylated hydroxyalkyl (meth)acrylates and esters of phosphoric acid with unalkoxylated or alkoxylated hydroxyalkyl(meth)acrylates; and
   ii) at least one emulsifier (E) selected from the group consisting of compounds of formula (I)

$$R^1\text{—O-(AO)}_m\text{—P(=O)(OR}^2\text{)(OH)} \quad (I),$$

wherein
m is an integer from 0 to 20,
AO is alkyleneoxy,
$R^1$ is $C_8$-$C_{30}$ alkyl, and
$R^2$ is H or a group $-(AO)_m$—$R^{2a}$, in which $R^{2a}$ is as defined for $R^1$, and AO and m are defined as above,
and the salts of the compounds of formula (I),
with a pigment paste or water,
wherein (M1) comprises exclusively monomers selected from principal monomers (M1.a) and secondary monomers (M1.b),
wherein (M1) comprises at least 50% by weight, based on a total weight of said monomers (M1) of principal monomers (M1.a) and less than 50% by weight based on the total weight of monomers (M1) of secondary monomers (M1.b))
wherein principal monomers (M1.a) are a mixture of n-butyl acrylate with methyl methacrylate, and secondary monomers (M1.b) are selected from acrylic acid, methacrylic acid, acrylamide, methacrylamide and a mixture thereof.

2. A polymer dispersion (PD) comprising:
   i) at least one polymer (P) obtained by free-radical emulsion polymerization of a monomer composition comprising:
   95% to 99.99% by weight, based on a total weight of monomers in the emulsion polymerization, of at least one ethylenically unsaturated monomer (M1); and
   0.01% to 5% by weight, based on a total weight of monomers in the emulsion polymerization, of at least one monomer (M2) different from (M1) and selected from esters of phosphonic acid or of phosphoric acid with unalkoxylated or alkoxylated hydroxyalkyl(meth)acrylates; and ii) at least one emulsifier (E) selected from the group consisting of compounds of formula (I) and salts of the compounds of formula (I), $$R^1-O-(AO)_m-P(=O)(OR^2)(OH) \quad (I),$$

wherein
m is an integer from 0 to 20,
AO is alkyleneoxy,
$R^1$ is $C_8$-$C_{30}$ alkyl, and
$R^2$ is H or a group -$(AO)_m$—$R^{2a}$, in which $R^{2a}$ is as defined for $R^1$, and AO and m have are defined as above, wherein (M1) comprises exclusively monomers selected from principal monomers (M1.a) and secondary monomers (M1.b), wherein (M1) comprises at least 50% by weight, based on a total weight of said monomers (M1) of principal monomers (M1.a) and less than 50% by weight based on the total weight of monomers (M1) of secondary monomers (M1.b))

wherein principal monomers (M1.a) are a mixture of n-butyl acrylate with methyl methacrylate, and secondary monomers (M1.b) are selected from acrylic acid, methacrylic acid, acrylamide, methacrylamide and a mixture thereof.

* * * * *